United States Patent
Agarwal et al.

(10) Patent No.: US 9,880,649 B2
(45) Date of Patent: Jan. 30, 2018

(54) TOUCH, PEN AND FORCE SENSOR OPERATION WITH VARIABLE REFRESH DISPLAYS

(71) Applicant: Apple Inc., Cupertino, CA (US)

(72) Inventors: Manu Agarwal, Redwood City, CA (US); Christopher Tann, San Jose, CA (US); Brijesh Tripathi, Los Altos, CA (US); Martin Paul Grunthaner, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/500,653

(22) Filed: Sep. 29, 2014

(65) Prior Publication Data

US 2016/0092010 A1    Mar. 31, 2016

(51) Int. Cl.
*G06F 3/041* (2006.01)
*G09G 5/12* (2006.01)

(52) U.S. Cl.
CPC ............. *G06F 3/0412* (2013.01); *G09G 5/12* (2013.01); *G09G 2310/04* (2013.01);
(Continued)

(58) Field of Classification Search
CPC ......... G06F 3/041; G06F 3/0412; G09G 5/18; G09G 2310/04; G09G 2330/0122; G09G 2340/0435; G09G 2354/00
(Continued)

(56) References Cited

U.S. PATENT DOCUMENTS 5,483,261 A    1/1996  Yasutake
5,488,204 A    1/1996  Mead et al.
(Continued)

FOREIGN PATENT DOCUMENTS

JP    2000-163031 A    6/2000
JP    2002-342033 A    11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Carolyn R Edwards
(74) *Attorney, Agent, or Firm* — Morrison & Foerster LLP

(57) ABSTRACT

Synchronization of display functions and various touch, stylus and/or force sensing functions for devices including a variable refresh rate (VRR) display is disclosed. In some examples, touch, stylus and/or force sensing functions can be synchronized with display frames and a display refresh rate can be adjusted by extended blanking of the display for one or more display frames. In other examples, touch, stylus and/or force sensing functions can be synchronized with display sub-frames and a display refresh rate can be adjusted by extended blanking of the display for one or more display sub-frames. Pre-warning synchronization signals can be generated to prepare one or more scan controllers to implement the appropriate scan events during and after extended blanking periods. Latency between the scan results and the corresponding image on the display can be corrected in software and/or firmware by time-stamping scan results or by dropping scan results from uncompleted scans.

21 Claims, 15 Drawing Sheets

(52) U.S. Cl.
CPC ............... *G09G 2330/022* (2013.01); *G09G 2340/0435* (2013.01); *G09G 2354/00* (2013.01)

(58) Field of Classification Search
USPC .................................................. 345/173–184
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 8,780,065 B2 | 7/2014 | Ribeiro et al. | |
| 8,947,373 B2 | 2/2015 | Kremin et al. | |
| 2006/0197753 A1 | 9/2006 | Hotelling | |
| 2006/0221011 A1* | 10/2006 | Aoki ..................... | G09G 3/325 345/76 |
| 2012/0256861 A1 | 10/2012 | Park | |
| 2013/0057503 A1 | 3/2013 | Hristov et al. | |
| 2013/0176251 A1* | 7/2013 | Wyatt ..................... | G09G 5/18 345/173 |
| 2013/0194229 A1 | 8/2013 | Sabo et al. | |
| 2013/0257752 A1* | 10/2013 | Tripathi .................. | G09G 3/20 345/173 |
| 2014/0002465 A1 | 1/2014 | Kwa et al. | |
| 2014/0071066 A1* | 3/2014 | Lee ........................ | G06F 3/0416 345/173 |
| 2014/0132560 A1 | 5/2014 | Huang et al. | |
| 2014/0267067 A1 | 9/2014 | Fuller et al. | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action dated Mar. 23, 2017, for U.S. Appl. No. 14/866,797, filed Sep. 25, 2015, 14 pages.

* cited by examiner

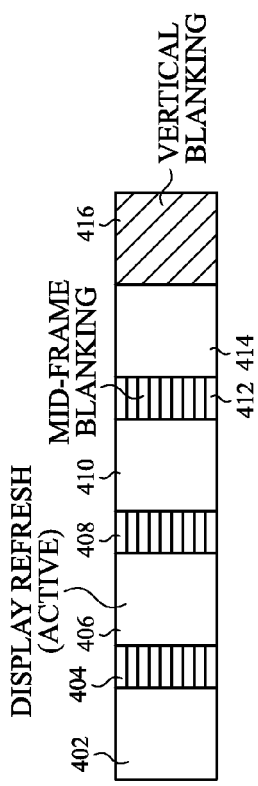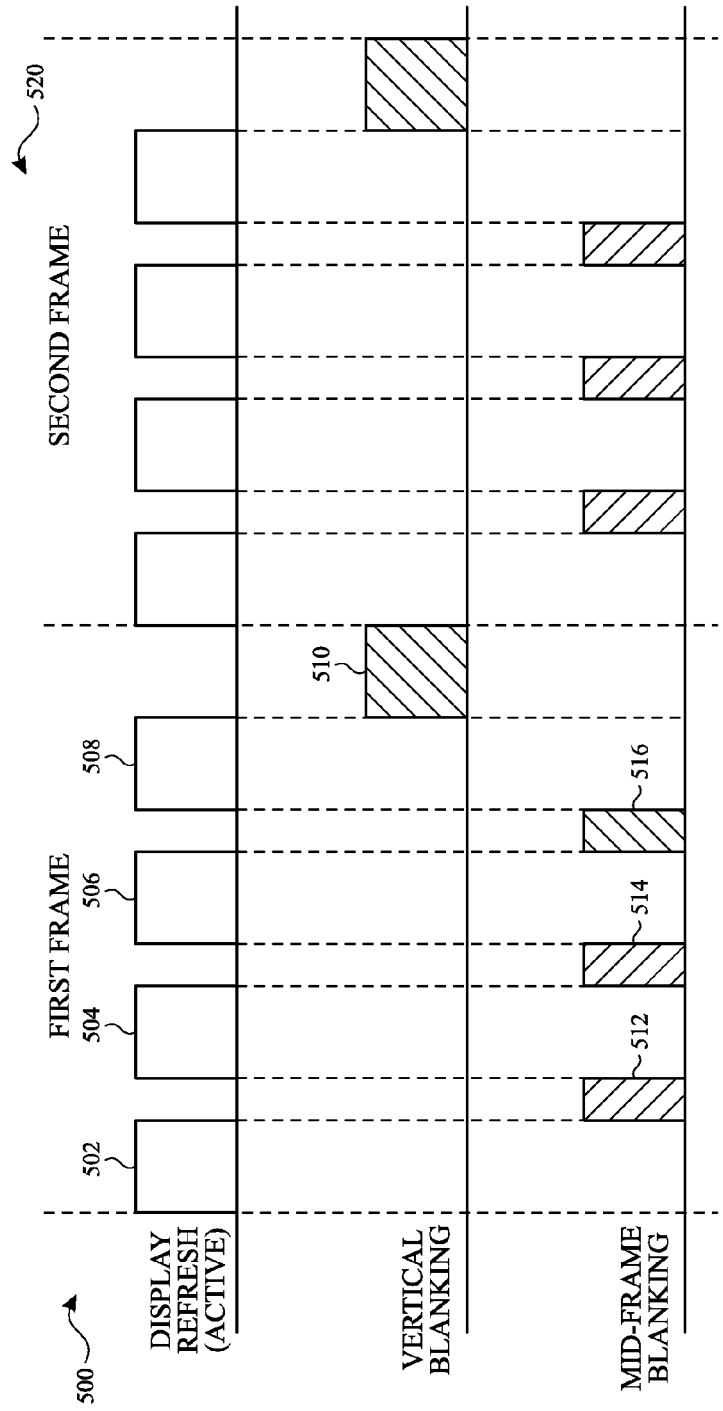

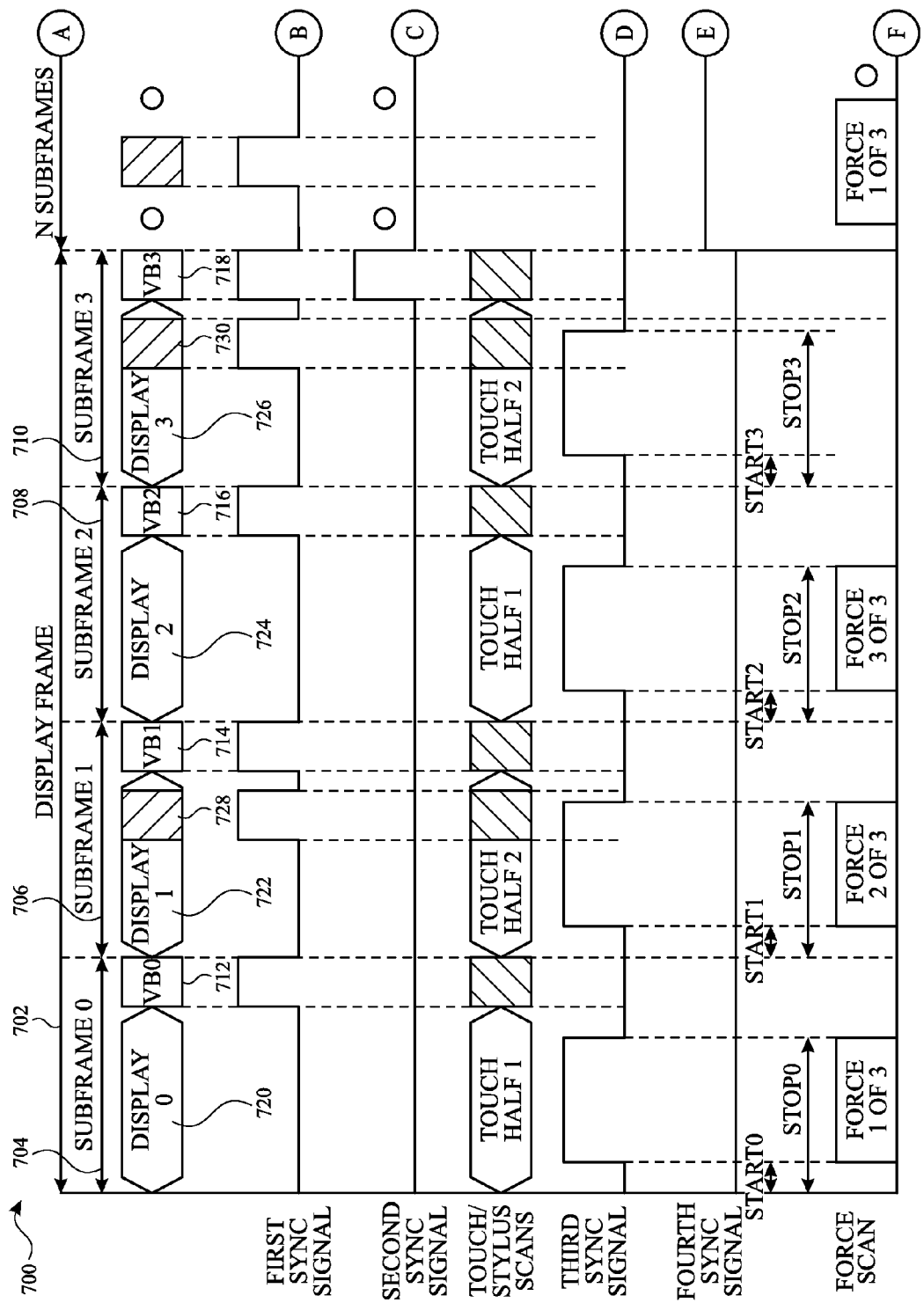

TOUCH, PEN AND FORCE SENSOR OPERATION WITH VARIABLE REFRESH DISPLAYS

FIELD OF THE DISCLOSURE

This relates generally to touch sensitive devices and, more specifically, to touch and force sensitive display devices that can have a variable refresh rate.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event. Additionally, touch sensitive devices can also be force sensitive devices and can also accept input from styli.

As touch sensing technology continues to improve, variable display rate displays can be used to save power when displaying static images or slowly changing images, or to improve performance in computationally intensive graphical environments (e.g., gaming environments). However, variable display rate operation can disrupt the synchronization between the display functions and various touch, stylus and/or force sensing functions, thereby degrading the performance of the device.

BRIEF SUMMARY OF THE DISCLOSURE

This relates to synchronizing display functions and various touch, stylus and/or force sensing functions for devices including a variable refresh rate (VRR) display. In some examples, touch, stylus and/or force sensing functions can be synchronized with display frames, and a display refresh rate can be adjusted by extended blanking of the display for one or more display frames. In other examples, touch, stylus and/or force sensing functions can be synchronized with display sub-frames, and a display refresh rate can be adjusted by extended blanking of the display for one or more display sub-frames. Pre-warning synchronization signals can be generated to prepare one or more scan controllers (e.g., touch, force, etc.) to implement the appropriate scan events during and after extended blanking periods. Latency between the scan results and the corresponding image on the display can be corrected in software and/or firmware by time-stamping scan results or by dropping scan results from uncompleted scans.

BRIEF DESCRIPTION OF THE DRAWINGS

FIG. 4 illustrates an exemplary frame timing diagram for a display according to examples of the disclosure.

FIG. 5 illustrates an exemplary two frame timing diagram for a display according to examples of the disclosure.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to synchronizing display functions and various touch, stylus and/or force sensing functions for devices including a variable refresh rate (VRR) display. VRR display operation can be beneficial, for example, to reduce power when displaying static or slow changing data and/or to avoid display artifacts by providing sufficient time to render high fidelity images in computationally intensive environments (e.g., video game applications) before refreshing the display. Synchronization in a fixed refresh rate system can be simplified because sensing operation and display operation timing can be known and fixed at the same rate (e.g., 60 Hz) such that touch and/or stylus sensing can occur during vertical blanking periods between frames, for example. Using the same operating frequency for touch and display operation can also create high fidelity matching between the touch and display to improve responsiveness of the device. In some cases, however, sensing performance can be improved by increasing the sensing frequency such that it can exceed the display frame rate (e.g., a stylus sensing scan can have improved performance by doubling the sensing frequency to 120 Hz). Additionally, in some cases sensing performance can be improved by performing sensing scans occur during periods of minimal interference between the sensor and display. Adjusting the VRR of the display can further complicate the synchronization of various sensing operations. For example, reducing a display refresh rate from 60 Hz to 48 Hz can create a smoother visual experience, but can upset the synchronization between the touch and display functions. Examples of the disclosure can insert one or more full display frames or one or more display sub-frames of extended blanking to adjust the refresh rate of the display and can synchronize the various sensing scans with the display frames or sub-frames to maintain synchronization. Pre-warning synchronization signals can be generated to prepare one or more scan controllers to implement the appropriate scan(s) during and after extended blanking periods. Latency between the sensing results and the corresponding image on the display can be corrected in software and/or firmware by time-stamping results or by dropping uncompleted scan results.

Figure 1A:
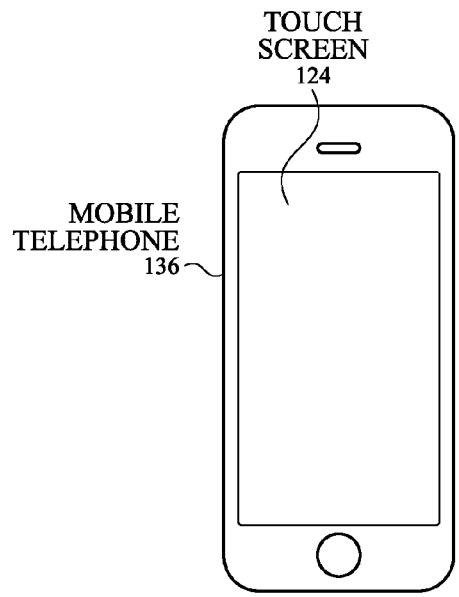
FIGS. 1A-1D illustrate exemplary systems with variable refresh rate (VRR) displays that can implement a synchronization scheme to synchronize display functions and various touch, stylus and/or force sensing functions according to examples of the disclosure.
Figure 1B:
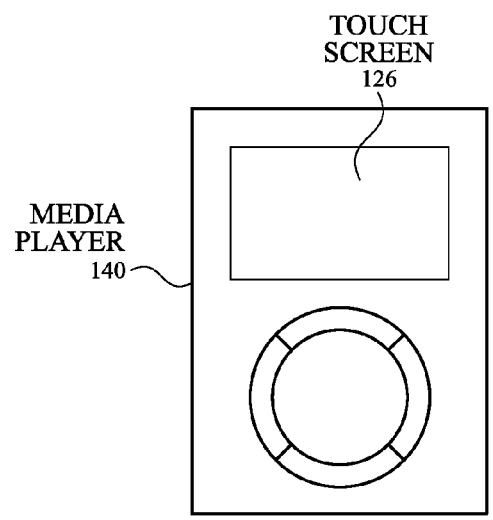
Figure 1C:
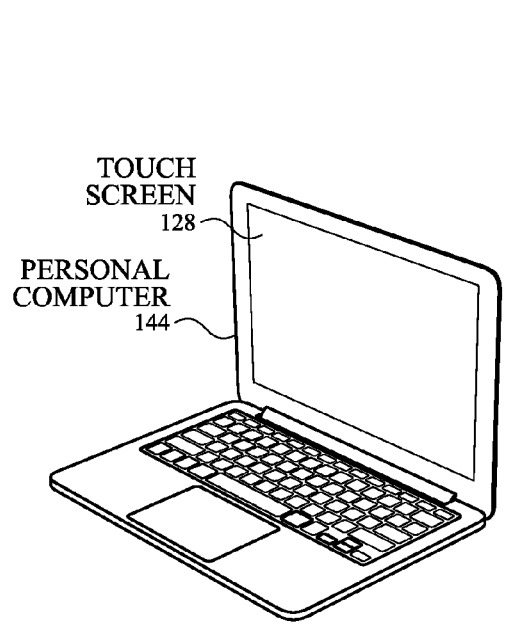
Figure 1D:
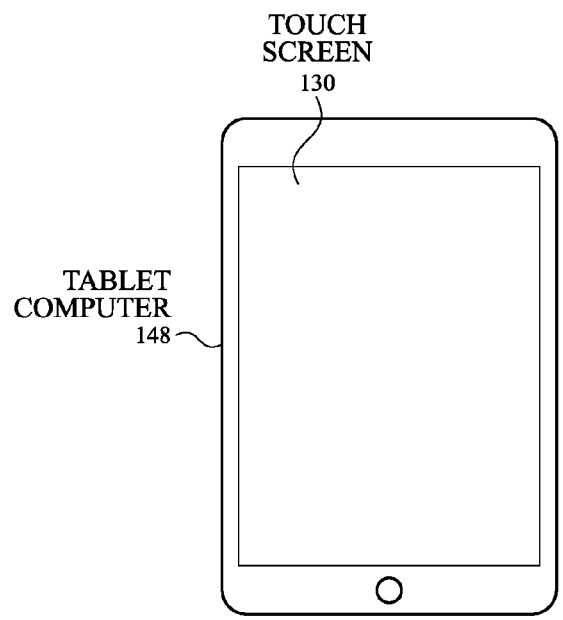

FIGS. 1A-1D illustrate exemplary systems with variable refresh rate (VRR) displays that can implement a synchronization scheme to synchronize display functions and various touch, stylus and/or force sensing functions according to examples of the disclosure. FIG. 1A illustrates an exemplary mobile telephone 136 that includes a VRR touch screen 124 and other computing system blocks that can implement a synchronization scheme to synchronize display functions and various touch, stylus and/or force sensing functions according to examples of the disclosure. FIG. 1B illustrates an example digital media player 140 that includes a VRR touch screen 126 and other computing system blocks that can implement a synchronization scheme to synchronize display functions and various touch, stylus and/or force sensing functions according to examples of the disclosure. FIG. 1C illustrates an example personal computer 144 that includes a VRR touch screen 128 and other computing system blocks that can implement a synchronization scheme to synchronize display functions and various touch, stylus and/or force sensing functions according to examples of the disclosure. FIG. 1D illustrates an example tablet computing device 148 that includes a VRR touch screen 130 and other computing system blocks that can implement a synchronization scheme to synchronize display functions and various touch, stylus and/or force sensing functions according to examples of the disclosure. The VRR touch screen and computing system blocks that can implement a synchronization scheme to synchronize display functions and various touch, stylus and/or force sensing functions can be implemented in other devices including wearable devices.

Figure 2:
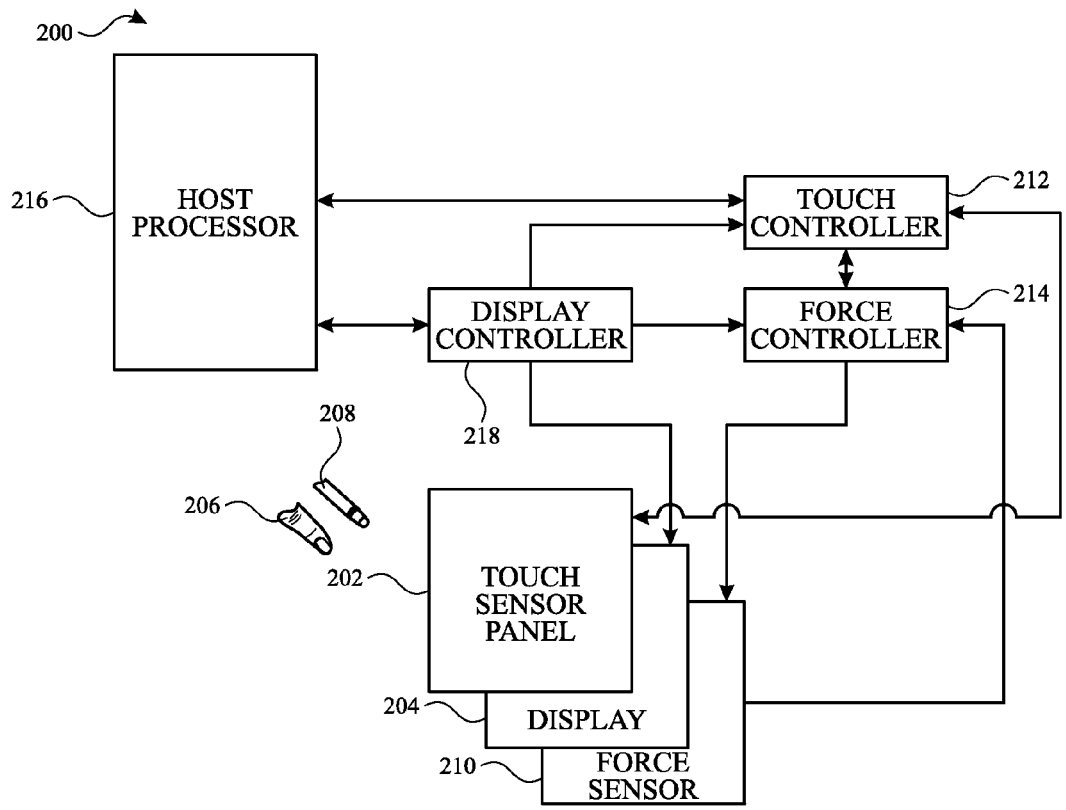
FIG. 2 illustrates an exemplary computing system capable of implementing a synchronization scheme to synchronize display functions and various touch, stylus and/or force sensing functions according to examples of the disclosure.

FIG. 2 illustrates an exemplary computing system capable of implementing a synchronization scheme to synchronize display functions and various touch, stylus and/or force sensing functions according to examples of the disclosure. Computing system 200 can include a touch sensor panel 202 to detect touch or proximity (e.g., hover) events from a finger 206 or stylus 208 at a touch sensitive surface of a device, such as a mobile phone, tablet, touchpad, portable or desktop computer, portable media player, wearable device or the like. Touch sensor panel 202 can include a pattern of electrodes to implement various touch and stylus sensing scans. The pattern of electrodes can be formed of transparent conductive medium such as Indium Tin Oxide (ITO) or Antimony Tin Oxide (ATO), although other transparent and non-transparent materials, such as copper, can also be used. For example, the touch sensor panel 202 can include an array of touch nodes that can be formed by a two-layer electrode structure (e.g., row and column electrodes) separated by a dielectric material, although in other examples the electrodes can be formed on the same layer. During a mutual capacitance scan, the row electrodes can be stimulated as drive lines and the column electrodes can be sensed to detect a change in the mutual capacitance formed therebetween. The signals received at the touch nodes can be viewed as capturing an "image" of touch. (In other words, after the touch controller 212 has determined whether a touch event occurred at each touch sensor in the touch sensor panel 202, the pattern of touch sensors in the multi-touch panel at which a touch event occurred can be viewed as an "image" of touch (e.g., a pattern of fingers touching the panel).) It should be understood that the row/drive and column/sense associations can be exemplary and in other examples, columns can be drive lines and rows can be sense lines. In some cases, row and column electrodes can be perpendicular such that touch nodes can have x and y coordinates, though other coordinate systems can also be used and the coordinates of the touch nodes can be defined differently. It should be understood that touch sensor panel 202 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans. Additionally, in some cases the touch sensor panel 202 can be formed from an array of electrodes that can be configured for pixelated self-capacitance scans. In a pixelated self capacitance scan, each electrode in the array of electrodes can act as a touch node.

In addition to touch sensor panel 202, computing system 200 can include a VRR display 204 and force sensor circuitry 210 to create a touch and force sensitive display screen. VRR display 204 can use liquid crystal display (LCD) technology, light emitting polymer display (LPD) technology, organic LED (OLED) technology, or organic electro luminescence (OEL) technology, although other display technologies can be used in other examples. In some examples, the touch sensor panel 202, VVR display 204 and/or force sensor circuitry 210 can be stacked on top of one another. For example, touch sensor panel 202 can cover a portion or substantially all of a surface of VRR display 204. In other examples, the touch sensor panel 202, VVR display 204 and/or force sensor circuitry 210 can be partially or wholly integrated with one another (e.g., share electronic components, such as in an in-cell touch screen). In some examples, force sensor circuitry 210 can measure mutual capacitance between electrodes mounted on the backplane of a display and electrodes mounted on a proximate flex circuit. The proximity of the touch sensor panel 202, VVR display 204 and/or force sensor circuitry 210 to each other can introduce noise or interference as described in more detail below.

Computing system 200 can include one or more processors, which can execute software or firmware implementing and synchronizing display functions and various touch, stylus and/or force sensing functions according to examples of the disclosure. The one or more processors can include a touch processor in touch controller 212, a force processor in force controller 214 and a host processor 216. Force controller 214 can implement force sensing operations, for example, by controlling force sensor circuitry 210 (e.g., stimulating one or more electrodes of the force sensor circuitry 210) and receiving force sensing data (e.g., mutual capacitance information) from the force sensor circuitry 210 (e.g., from one or more electrodes mounted on a flex circuit). In some examples, the force controller 214 can be coupled to the touch controller 212 (e.g., via an I2C bus) such that the touch controller can configure the force controller 214 and receive the force information from the force controller 214.

Touch controller 212 can include the touch processor and can also include peripherals (not shown) such as random access memory (RAM) or other types of memory or storage, watchdog timers and the like. Additionally, touch controller 212 can include circuitry to drive (e.g., analog or digital scan logic) and sense (e.g., sense channels) the touch sensor panel 202, which in some examples can be configurable based the scan event to be executed (e.g., mutual capacitance row-column scan, row self-capacitance scan, stylus scan, etc.). The touch controller 212 can also include a scan plan (e.g., stored in memory) which can define a sequence of scan events to be performed at the touch sensor panel. In one example, during a mutual capacitance scan, drive circuitry can be coupled to each of the drive lines to stimulate the drive lines, and the sense circuitry can be coupled to each of the sense lines to detect changes in capacitance at the touch nodes. The drive circuitry can be configured to generate stimulation signals to stimulate the touch sensor panel one drive line at a time or to generate multiple stimulation signals at various frequencies, amplitudes and phases that can be simultaneously applied to drive lines of touch sensor panel (i.e., multi-stimulation scanning). In some examples, the touch controller 212 can be implemented as a single application specific integrated circuit (ASIC) including the touch processor, drive and sense circuitry, and peripherals, though in other examples, the touch controller can be divided into separate circuits. The touch controller 212 can also include a spectral analyzer to determine low noise frequencies for touch and stylus scanning. The spectral analyzer can perform spectral analysis on the scan results from an unstimulated touch sensor panel.

Host processor 216 can receive outputs (e.g., touch information) from touch controller 212 and can perform actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

Host processor 216 can execute software or firmware implementing the synchronization scheme to synchronize display functions and various touch, stylus and/or force sensing functions. Host processor 216 can also perform additional functions that may not be related to touch sensor panel processing, and can be coupled to program storage and display 204 for providing a UI to a user of the device. Display 204 together with touch sensor panel 202, when located partially or entirely under the touch sensor panel 202, can form a touch screen. The computing system 200 can process the outputs from the touch sensor panel 202 to perform actions based on detected touch or hover events and the displayed graphical user interface on the touch screen.

Computing system 200 can also include a display controller 218. The display controller 218 can include hardware to process one or more still images and/or one or more video sequences for display on display 204. The display controller 218 can be configured to generate read memory operations to read the data representing the frame/video sequence from a memory (not shown) through a memory controller (not shown), for example. The display controller 218 can be configured to perform various processing on the image data (e.g., still images, video sequences, etc.). In some examples, the display controller 218 can be configured to scale still images and to dither, scale and/or perform color space conversion on the frames of a video sequence. The display controller 218 can be configured to blend the still image frames and the video sequence frames to produce output frames for display. The display controller 218 can also be more generally referred to as a display pipe, display control unit, or display pipeline. The display control unit can be generally any hardware and/or firmware configured to prepare a frame for display from one or more sources (e.g., still images and/or video sequences). More particularly, the display controller 218 can be configured to retrieve source frames from one or more source buffers stored in memory, composite frames from the source buffers, and display the resulting frames on the display 204. Accordingly, display controller 218 can be configured to read one or more source buffers and composite the image data to generate the output frame.

In some examples, the display controller and host processor can be integrated into an ASIC, though in other examples, the host processor 216 and display controller 218 can be separate circuits coupled together. The display controller 218 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display controller 218 can control the display 204 in real-time, providing the data indicating the pixels to be displayed as the display is displaying the image indicated by the frame. The interface to such a display 204 can be, for example, a video graphics array (VGA) interface, a high definition multimedia interface (HDMI), a digital video interface (DVI), a LCD interface, a plasma interface, or any other suitable interface.

Computing system 200 can also include a wireless module (not shown). The wireless module can implement a wireless communication standard such as a WiFi®, BLUETOOTH™ or the like. The wireless module can be coupled to the touch controller 212 and/or host processor 216. The touch controller 212 and/or host controller can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies the stylus can use to generate a stimulation signals. Alternatively, timing information can be used to synchronize the stylus 208 with the computing system 200, and the scan plan information can be used to indicate to the stylus 208 when the computing system 200 expects a stylus scan. In some examples, the wireless module can also receive information from peripheral devices, such as a stylus 208, which can be transmitted to the touch controller 212 and/or host processor 216. In other examples, the wireless communication functionality can be incorporated in other components of computing system 200, rather than in a dedicated chip.

Note that one or more of the functions described above can be performed by firmware stored in memory and executed by the touch processor in touch controller 212, or stored in program storage and executed by host processor 216. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
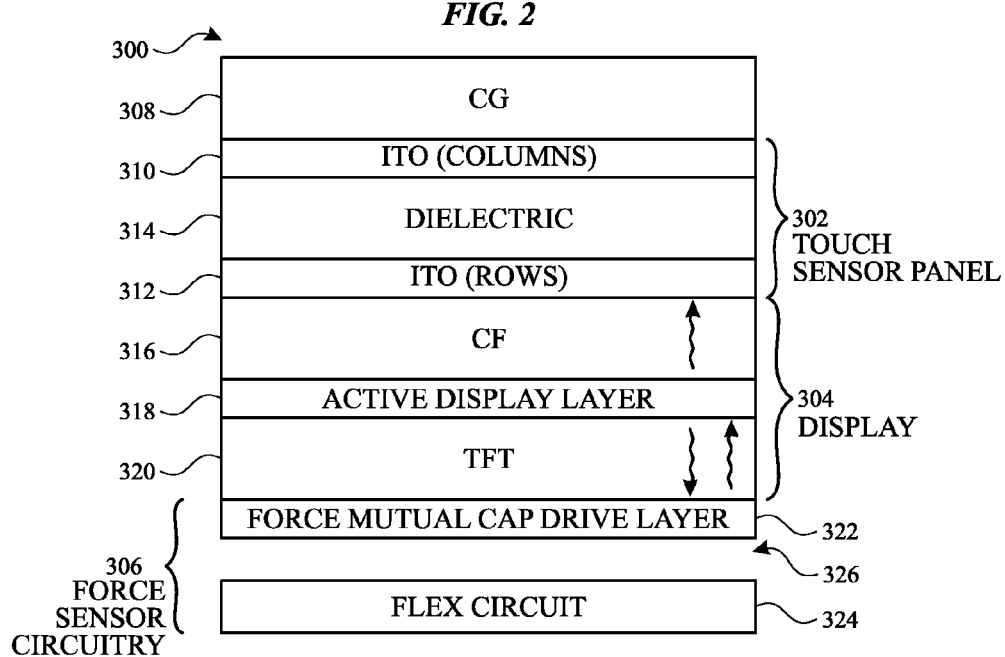
FIG. 3 illustrates an exemplary stack-up of a touch sensor panel, display and force sensor circuitry according to examples of the disclosure.

The various sensing operations (e.g., touch, stylus, force) can be synchronized with display operation to minimize interference and noise. Noise and/or interference between components can occur due to the proximity in the stack-up. FIG. 3 illustrates an exemplary stack-up of a touch sensor panel, display and force sensor circuitry according to examples of the disclosure. Touch and force sensitive display 300 can include a touch sensor panel 302, display 304, and force sensor circuitry 306. In some examples, the touch sensor panel 302, display 304, and force sensor circuitry 306 can be separate components adhered to one another with adhesive or otherwise coupled. In other examples, some or all of touch sensor panel 302, display 304, and force sensor circuitry 306 can be integrated and/or share components. Touch sensor panel 302 can include a layer of column electrodes 310 (e.g., ITO) and a layer of row electrodes 312 separated by a dielectric layer 314. Touch sensor panel 302 can be disposed beneath a protective cover glass 308. Display 304 can be disposed beneath the touch sensor panel 302 and can be an LCD display including a color filter glass 316, active display layer 318, and TFT glass 320. For simplicity, some components of the display, such as one or more polarizing layers, a common electrode, a liquid crystal layer and a backlight are not shown. Force sensing circuitry 306 can be disposed below display 304. The force sensing circuitry 306 can include a force mutual capacitance electrode layer 322 (e.g., mounted on the backplane of the display 204), and a second layer of electrodes on flex circuit 324 separated by a dielectric layer 326. The proximity of the touch sensor panel 302, especially the layer of row electrodes 312, to the active display layer 318 can cause noise to be introduced into touch and stylus sensing measurements during active refresh of the display. Similarly, the proximity of the force sensor circuitry 306, especially the force mutual capacitance drive layer 322, to the active display layer 318 can cause noise to be introduced into force sensing measurements due to a display line refresh. Likewise, the force sensing measurements can introduce noise that can disrupt or degrade the operation of the display. In some cases, noise and interference can be compensated for, but in other cases, synchronizing various sensing scans with the display function can improve performance.

In a system with a fixed refresh rate display, the various sensing operations can be timed to occur during specific display operations to reduce interference. FIG. 4 illustrates an exemplary frame timing diagram for a display according to examples of the disclosure. The vertical components of a single frame 400 can include display active periods 402, 406, 410 and 414 separated by intra-frame blanking periods 404, 408 and 412. The frame 400 can conclude with a vertical blanking period 416. It should be noted that the number of display active periods and intra-frame blanking periods illustrated in FIG. 4 are only representative, and additional or fewer display active periods and intra-frame blanking periods can be implemented for a frame. Additionally, the order of display active refresh periods, intra-frame blanking periods and vertical blanking period in frame 400 illustrated in FIG. 4 can be different (e.g., begin with vertical blanking rather than end with vertical blanking). In some examples, the vertical blanking period 416 and the intra-frame blanking periods 404, 408 and 412 can be chosen to have the same duration, though in other examples the duration of vertical blanking 416 can be longer than intra-frame blanking. The location of vertical blanking period 416 and the intra-frame blanking periods 404, 408 and 412 can be chosen such that they are spaced at fixed, regular intervals in time so that touch and stylus sensing scans can be performed at a constant frequency.

During the four display active refresh periods illustrated in FIG. 4, a mutual capacitance scan can be performed at the touch sensor panel. For example, a portion of the touch sensor panel can be scanned during each of the display active refresh periods such that over the course of a frame, the entire touch sensor panel can be scanned. In the case of a 60 Hz display frame rate, the mutual capacitance touch sensing scan can also occur at a 60 Hz rate. In other examples, high frequency touch sensing scans can be desired. The touch sensing scanning frequency can be doubled to 120 Hz by scanning the entire touch sensor panel during two display active refresh periods or quadrupled to 240 Hz by scanning the entire touch sensor during each display active refresh period. As discussed herein, it can be desirable in some examples for touch sensing and display to occur at the same rate in order to reduce any latency between the content displayed on the screen and the corresponding touch sensing data. The interference between the active display and the touch sensor panel during a mutual capacitance scan can be compensated for using existing methods (ground planes or electrodes, etc.), such that a 60 Hz mutual capacitance touch scan can occur during active display refresh periods.

Other scans that require low noise conditions can take place during intra-frame and vertical blanking periods. For example, stylus scans can require scanning on both row and column electrodes and can require a low noise environment to have a sufficient signal-to-noise ratio (SNR). A high frequency scan (e.g., 240 Hz) can require some algorithmic correction of common mode display noise if performed during active refresh, or alternatively the stylus scan can occur during intra-frame and vertical blanking of the display. For example, performing a stylus scan during each of the three illustrated intra-frame blanking periods and during at least a portion of the vertical blanking period in a 60 Hz frame rate system can result in a 240 Hz stylus scan in an appropriate low noise environment.

In other examples, some or all of the vertical blanking period can be used to perform touch sensing scans that require low noise conditions. For example, poor user grounding can degrade touch sensing performance (e.g., negative pixel effects and lost contacts). The touch system can compensate for poor grounding by performing additional scans including one or more of row-row mutual capacitance scans, column-column mutual capacitance scans and self-capacitance scans. These additional scans, especially the scans using the electrodes proximate to the display, can occur during the intra-frame blanking or vertical blanking periods to ensure sufficient SNR, for example. Similarly, some features can be enabled by performing self-capacitance scans that can be performed during vertical blanking periods. For example, a device can be placed in a low power ready mode and use self-capacitance scans to detect an object approaching the touch sensitive surface of the device, and then switch the device to perform mutual capacitance scans for improved multi-touch performance. Algorithmic correction for the self-capacitance scan can be difficult to implement, and thus scanning during low noise vertical blanking periods can produce self-capacitance scans with sufficient SNR.

Force sensing scans can also be performed during relatively low noise periods during each display line refresh. For example, during the display active refresh period, one or more display lines can be refreshed. The display line refresh command introduces noise which can decay and settle over time. The force sensing scans can occur during intervals of the display active refresh period, where the noise can be reduced after it decays and settles (in addition to occurring during the intra-frame blanking and vertical blanking periods).

Although touch, stylus and force scans are discussed, other sensor scans can require synchronization with the display line refresh timing in order to mitigate or avoid noise and/or interference between the display operation and sensor scanning operation. Alternatively, the other sensor scans can require synchronization with the display intra-frame and vertical blanking periods.

FIG. 5 illustrates an exemplary two frame timing diagram for a display according to examples of the disclosure. The pixels of the first frame 500 can be driven in four separate active refresh periods 502, 504, 506 and 508. A portion of the first frame can be written to the display during each of the active refresh periods. The active refresh periods 502, 504, 506 and 508 can be separated by intra-frame blanking periods 512, 514, and 516. During the intra-frame blanking periods, the display controller can temporarily stop driving display pixels to the display. In some examples, dummy pixels can be generated by the display controller instead of actual pixels. Similarly, during the vertical blanking period 510 at the end of the first frame, no pixels can be driven to the display. The same timing of active display refresh (i.e., driving), intra-frame blanking periods, and vertical blanking periods for the first frame can be continued for the second frame. This pattern of frame timing can continue until necessitated by a change in the scanning and display behavior of the system.

Figure 6:
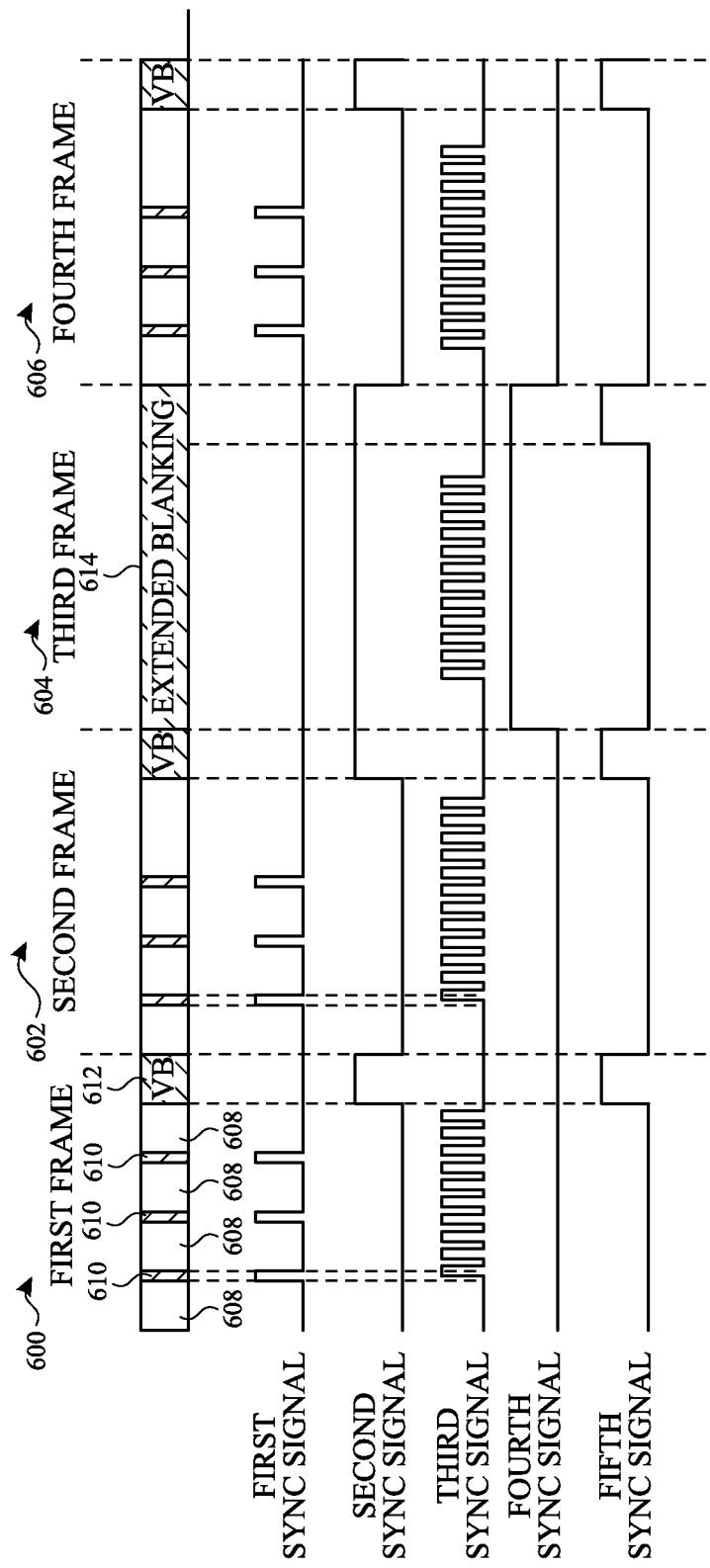
FIG. 6 illustrates an exemplary timing diagram for synchronizing sensing operations with display operations for a VRR display according to examples of the disclosure.

FIG. 6 illustrates an exemplary timing diagram for synchronizing sensing operations with display operations for a VRR display according to examples of the disclosure. Specifically, the example of FIG. 6 corresponds to a system with a display that can operate with a variable refresh rate and can synchronize touch, stylus and/or force sensing with the display function. A variable refresh rate can be generated by inserting a period of extended blanking (i.e., no active refresh) between two display frames. The duration of the extended blanking can depend on the desired refresh rate. For example, in a system with a 60 Hz frame rate, adding a 60 Hz frame of extended blanking can change the display refresh rate to 30 Hz (i.e., refresh the display once every two frames), and adding two 60 Hz frames of extended blanking can change the display refresh rate to 20 Hz (i.e., refresh the display once every 3 frames). It should be understood that the possible frame refresh rate can depend on a default frame rate and the number of blanking frames.

The timing diagram of FIG. 6 illustrates four frames of operation. Each frame can have the same duration (e.g., 16.67 ms or 60 Hz). In the example of FIG. 6, first frame 600 and fourth frame 606 can correspond to a 60 Hz display refresh rate and can include one or more active refresh periods 608, intra-frame blanking periods 610 and vertical blanking period 612. Second frame 602 and third frame 604 can together correspond to a 30 Hz display refresh rate. Second frame rate can be similar to the first frame 600 and fourth frame 606 including one or more intra-frame blanking periods 610 and vertical blanking period 612. The third frame rate can be an extended blanking period 614.

By adding extended blanking periods with a duration matching the remaining frames, the synchronization between the various touch, stylus and/or force sensing scans can be preserved. As discussed above, the scanning operations can be synchronized with the display frame. FIG. 6 illustrates synchronization signals that can be used to synchronize touch scanning frames with display frames. For example, a first synchronization signal can be logic high to indicate intra-frame blanking periods 610 and a second synchronization signal can be logic high to indicate vertical blanking 612 and/or extended blanking 614. The first and second synchronization signals can be used, for example, to synchronize the display blanking periods with scans requiring low noise for improved performance. A third synchronization signal can be logic high to indicate periods to perform force sensing scans. As discussed above, in some examples, to minimize interference between the display and force sensing circuitry, the force scans should occur after noise from driving a display line has settled, which can correspond to the rising edge of the third synchronization signal. In other words, the force sensing scans can be synchronized based on the display line refresh timing. The third synchronization signal can in some cases toggle multiple times (e.g., toggle for each display line refresh or some integer number of display line refresh), though in other cases, the third synchronization can toggle once per display frame and the force controller can execute the force scans accordingly. In some examples, the toggling of the third synchronization signal and therefore the force sensing scan can begin after a fixed period of time from the start of a frame. A fourth synchronization signal can be logic high to indicate a period of extended blanking. A fifth synchronization signal can be logic high to indicate a period of vertical blanking (not including extended blanking), and can be used as a display pre-warning signal to synchronize the display frames having the same duration (e.g., 60 Hz).

Returning to FIG. 2, in some cases the first, second, third and fourth signals can be generated by display controller 218. The third synchronization signal can be transmitted to force controller 214 to synchronize force scans. The first, second and fourth scans can be transmitted from the display controller 218 to touch controller 212 to synchronize touch and or stylus scans. The fifth synchronization signal can be generated by the host processor 216 and transmitted to the display controller 218 to generate the first through fourth synchronization signals. In some cases, the fourth synchronization signal can be implemented as a pre-warning signal to inform the touch controller 212 of an upcoming extended blanking period corresponding to a modified display refresh rate. In other words, the fourth synchronization signal can toggle early (e.g., to logic high or logic low) in order to give the touch controller 212 advanced warning to implement touch and/or stylus scans appropriate for an extended blanking period and to prepare for display refresh after extending blanking periods. In some examples, the pre-warning can be implemented using the interface between the host processor 216 and the display controller 218. Specifically, in some examples, portions of the wake up protocol for the interface between the host processor 216 and the display controller 218 can be used to generate the pre-warning signals. In other examples, some synchronization signals (e.g., the first and/or the fourth synchronization signals) can have a register programmable option to de-assert at the beginning of the active display refresh or on the arrival of the pre-warning signals. De-asserting the first and fourth synchronization signals can provide the touch controller 212 with a pre-warning of upcoming blanking and/or upcoming display refresh.

It should be noted that during an extended blanking period, the touch, stylus and/or force scans can be performed at any time, as no active display refresh operations can be occurring. Nonetheless, "fake" synchronization signals can continue to be sent during this period to the touch controller 212 and force controller 214 which can be expecting such signals to perform scans.

In other examples, the synchronization signals can all be generated by the host processor 216 and transmitted directly to the touch controller 212 or display controller 218 (rather than having the display controller 218 act as an intermediary between the host processor 216 and touch controller 212). The third synchronization signal, however, can continue to be generated by the display controller 218 to avoid any latency in synchronizing the display and force scans.

Preserving the synchronization between touch, stylus and/or force scans and the display frames can permit uninterrupted touch, stylus and/or force scans along with the benefits of synchronizing various scans to occur during intra-frame blanking, vertical blanking and display line refresh.

Figure 7:
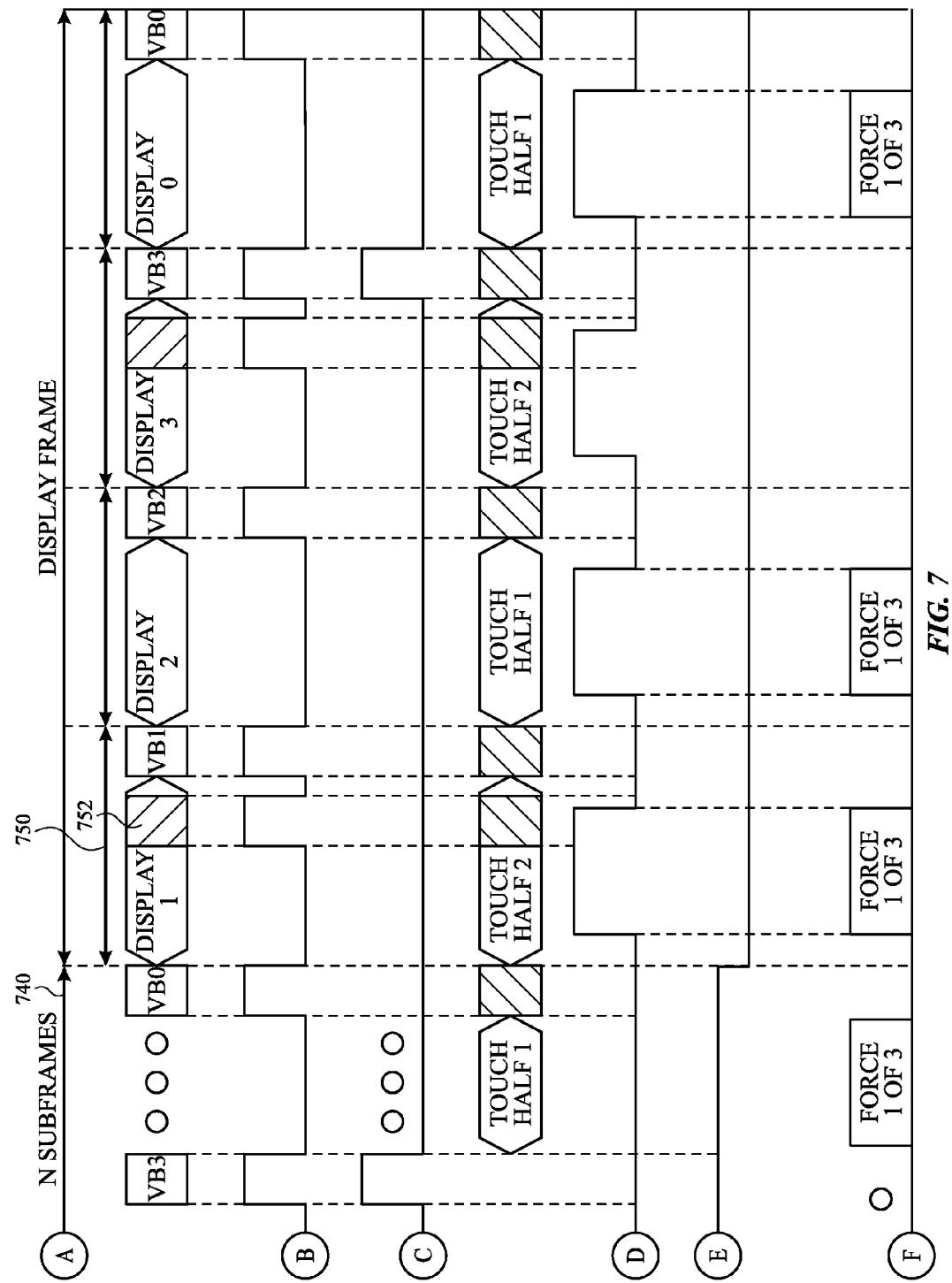
FIG. 7 illustrates another exemplary timing diagram for synchronizing sensing operations with display operations for a VRR display according to examples of the disclosure.

FIG. 7 illustrates another exemplary timing diagram for synchronizing sensing operations with display operations for a VRR display according to examples of the disclosure. In the example of FIG. 7, instead of requiring an entire frame period of blanking and synchronizing scanning frames and display frames, the display frame can be divided into sub-frames and sensing scans can be synchronized with sub-frames. The timing diagram 700 illustrates a display frame 702 (e.g., a 60 Hz display frame) divided into four sub-frames 704, 706, 708 and 710. Although four sub-frames are illustrated in FIG. 7, the display frame can be divided into a different number of frames depending, for example, on the desired flexibility of variable refresh rates. For example one sub-frame of extended blanking can reduce the display refresh rate from 60 Hz to 48 Hz. Similarly, two sub-frames of extended blanking can reduce the display refresh rate from 60 Hz to 40 Hz. Increasing the number of sub-frames can increase the range and granularity of the available variable refresh rates.

Each of sub-frames 704, 706, 708, and 710 can include a period of active refresh and vertical blanking. For example the first sub-frame ("sub-frame 0") 704 can have an active refresh period 720 and a vertical blanking period 712. Likewise the second, third and fourth sub-frames (sub-frames 1, 2 and 3) 706, 708 and 710 can have active refresh periods 722, 724 and 726, and vertical blanking periods 714, 716 and 718 respectively. Some or all of the sub-frames can include intra-sub-frame blanking. For example, the second sub-frame 706 can have intra-sub-frame blanking 728 and the fourth sub-frame 710 can have intra-sub-frame blanking 730. During each sub-frame, the display can actively refresh a portion of the display such that over the course of four sub-frames of the display frame 702, the entire display can be refreshed.

Synchronization signals can be generated by the host processor 216. For example, the host processor 216 can generate four synchronization signals. A first synchronization signal can be logic high during periods corresponding to intra-sub-frame blanking and/or sub-frame vertical blanking. The first synchronization signal can be used to synchronize scans that require blanking with blanking periods of the display. A second synchronization signal can be logic high during periods corresponding to vertical blanking at the end of a display frame. The second synchronization signal can act as a signal to synchronize the touch controller 212 with the display. Thus, for example, during sub-frames 704 and 708, the touch controller can perform a mutual capacitance touch scan of a first half of the touch sensor panel. Likewise, during sub-frames 706 and 710, the touch controller can perform a mutual capacitance touch scan of a second half of the touch sensor panel. Performing two mutual capacitance scans of the panel can correspond to a 120 Hz scanning rate. In other examples, one quarter of the panel can be scanned during each sub-frame to produce a 60 Hz mutual capacitance touch scan. In yet other examples, the two sub-frames (e.g., 704 and 706) can be used to scan the panel for a 60 Hz touch scan and two sub-frames (e.g., 708 and 710) can be used for another scan, e.g. a 60 Hz stylus scan. During the intra-sub-frame blanking and vertical blanking periods, the touch controller can perform low-noise scans such as row-row mutual capacitance scans or self-capacitance row and/or column scans.

A third synchronization signal can be logic high during periods corresponding to force sensing scans. In some examples, the rising edge of the third synchronization signal can occur a first threshold time after a last sub-frame vertical blanking concludes, and the falling edge of the third synchronization signal can occur a second threshold time after the last sub-frame vertical blanking concludes. In other examples, the timing can be based one or more other signals. Additionally, as discussed above, in some cases the third synchronization signal can toggle multiple times during a scan (e.g., toggling at the display line refresh rate or some fraction of the display refresh rate). A force sensing scan can be broken up into sub-scans that can be performed during sub-frames. For example, as illustrated in FIG. 7, the force scan can be broken into three portions which can be performed in the first three sub-frames for example, and a fourth sub-frame can have no force scan. In other examples, the force sensor can be broken up into a different number of sub-scans distributed over the number of sub-frames. The measurements from each force sub-scan can be processed (e.g., averaged) to produce a single force reading for the display frame. Dividing force sensing scans into sub-scans and processing the results into a single force reading can be used to generate results from force sensing scans which can be interrupted if the third synchronization signal stops toggling during pauses in display refresh (e.g., during intra-frame blanking, vertical blanking, and/or extended blanking).

A fourth synchronization signal can be logic high during periods corresponding to extended blanking. The fourth synchronization signal can be implemented as a pre-warning signal, such that the rising edge can pre-warn of an upcoming extended blanking period and the falling edge can pre-warn of an upcoming display refresh. The pre-warning signals can be used to configure the force controller for either self-timed or display-synchronized scanning modes. For display-synchronized scanning modes, the third synchronization signal can continue to generate the "fake" (i.e., emulated) display line synchronization signals that the force controller expects to synchronize the force sensing scans during extended blanking. In some examples, the force sensing circuitry 210 can be configured to self-time the scan during extended blanking periods rather than using the third synchronization signals to perform the force scans. During a self-timed scan, the controller can be configured to perform the force scan or sub-scan without the need for the third synchronization signal (e.g, by generating an internal signal in the force controller during extended blanking). During the extended blanking, the host processor 216 can continue to send the touch controller 212 the second synchronization signal to preserve the synchronization between the touch controller 212 and the display. The various touch and/or stylus scans can continue to be performed, without regard for the first synchronization signal (though "fake" synchronization signals can continue to be generated) as long as the display can be in extended blanking.

At the conclusion of N extended blanking sub-frames, the display can return to a full display frame, but touch, stylus and/or force scans can be mid-scan. For example, as illustrated in FIG. 7, at the conclusion of extended blanking 740, the first display sub-frame 750 can be refreshing the display corresponding to the portion of the display updated in the second sub-frame 706 in frame 702. The host controller can even maintain the intra-sub-frame blanking period 752 that can correspond to the expected display intra-sub-frame blanking period 728 expected by the sensing system. Likewise, the touch scan performed during sub-frame 750 can be the second half of a touch scan ("Touch Half 2"), whereas the first half of the scan can be performed in the previous sub-frame during the N sub-frames of extended blanking 740. Similarly, the force scan performed during sub-frame 750 can be the second of three force scans. The touch, stylus and/or force scans, however, can continue and remain synchronized with the updating of the display because the sensing scans remain synchronized with the display sub-frames. Preserving the synchronization between touch, stylus and/or force scans and the display sub-frames can permit uninterrupted touch, stylus and/or force scans along with the benefits of synchronizing various scans to occur during intra-sub-frame blanking, vertical blanking and display line refresh.

Figure 8:
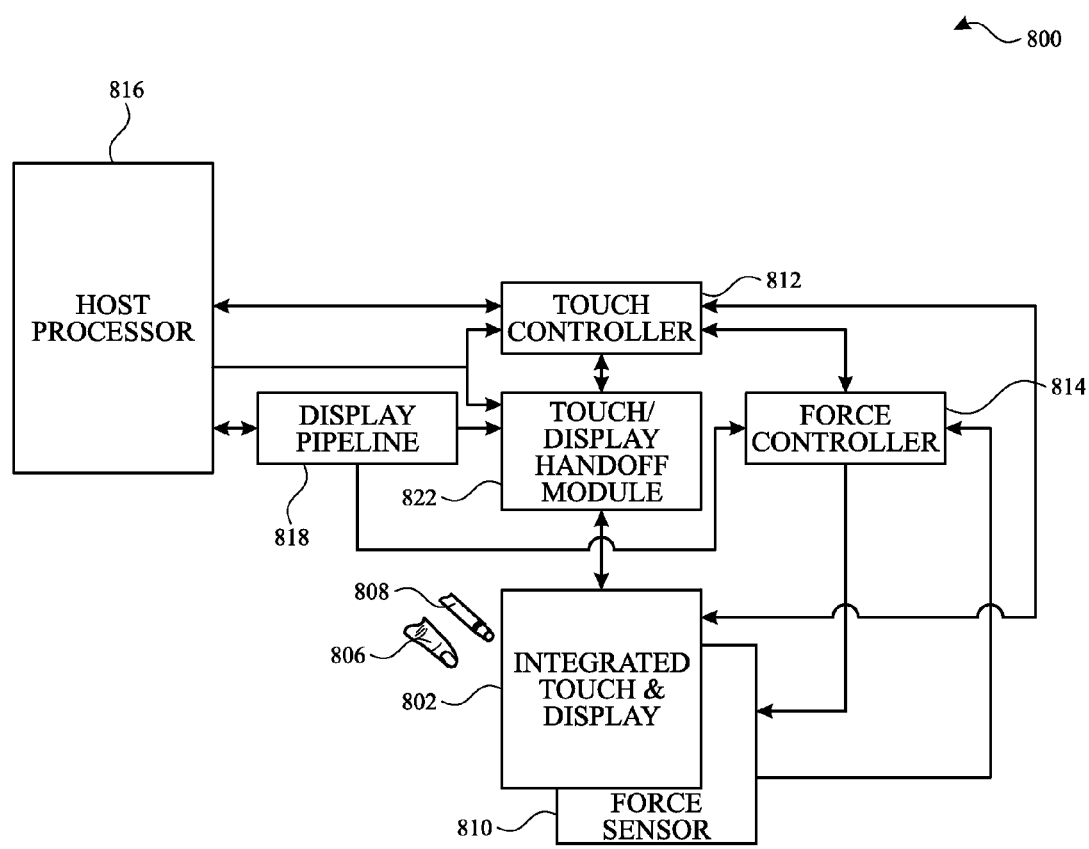
FIG. 8 illustrates an exemplary computing system capable of implementing a synchronization scheme to synchronize display functions and various touch, stylus and/or force sensing functions according to examples of the disclosure.

In other examples, a computing system can use an in-cell touch screen. FIG. 8 illustrates an exemplary computing system capable of implementing a synchronization scheme to synchronize display functions and various touch, stylus and/or force sensing functions according to examples of the disclosure. For simplicity, the function of the elements in the block diagram of computing system 800 will be discussed insofar as they depart from the discussion regarding computing system 200. Computing system 800 can include an in-cell touch screen 802 that can both detect touch or hover events from a finger 806 or stylus 808 at a surface of in-cell touch screen 802. Computing system 800 can include force sensor circuitry 810 to create a force sensitive touch screen. Computing system 800 can also include one or more processors, which can execute software or firmware implementing and synchronizing display functions and various touch, stylus and/or force sensing functions. The one or more processors can include a touch processor in touch controller 812, a force processor in force controller 814 and a host processor 816. Force controller 814 can be coupled to the touch controller 812 (e.g., to configure the force controller 814 and receive the force information from the force controller 814) and to the display controller 818 to receive synchronization signals. Touch controller 812 can execute one or more touch and/or stylus scan events as discussed above. Host processor 816 can be coupled to the touch controller 812 and can receive outputs (e.g., touch information and/or scan plans over a bus, such as an SPI bus) from touch controller 812. Host processor 816 can execute software or firmware implementing the synchronization scheme to synchronize display functions and various touch, stylus and/or force sensing functions. Computing system 800 can also include a display controller 818 to control the operation of the display based on information from the host processor 816. The display controller 818 can generate synchronization signals for the force controller 814 as discussed above. The touch controller 812 and display controller 218 can be coupled to a touch and display handoff module 822. The touch and display handoff module 822 can appropriately operate the in-cell touch screen 802 according to the scanning and display instructions from the touch controller 812 and the display controller 818. Computing system 800 can also include a wireless module 820 that operates as discussed above with respect to FIG. 2.

Figure 9:
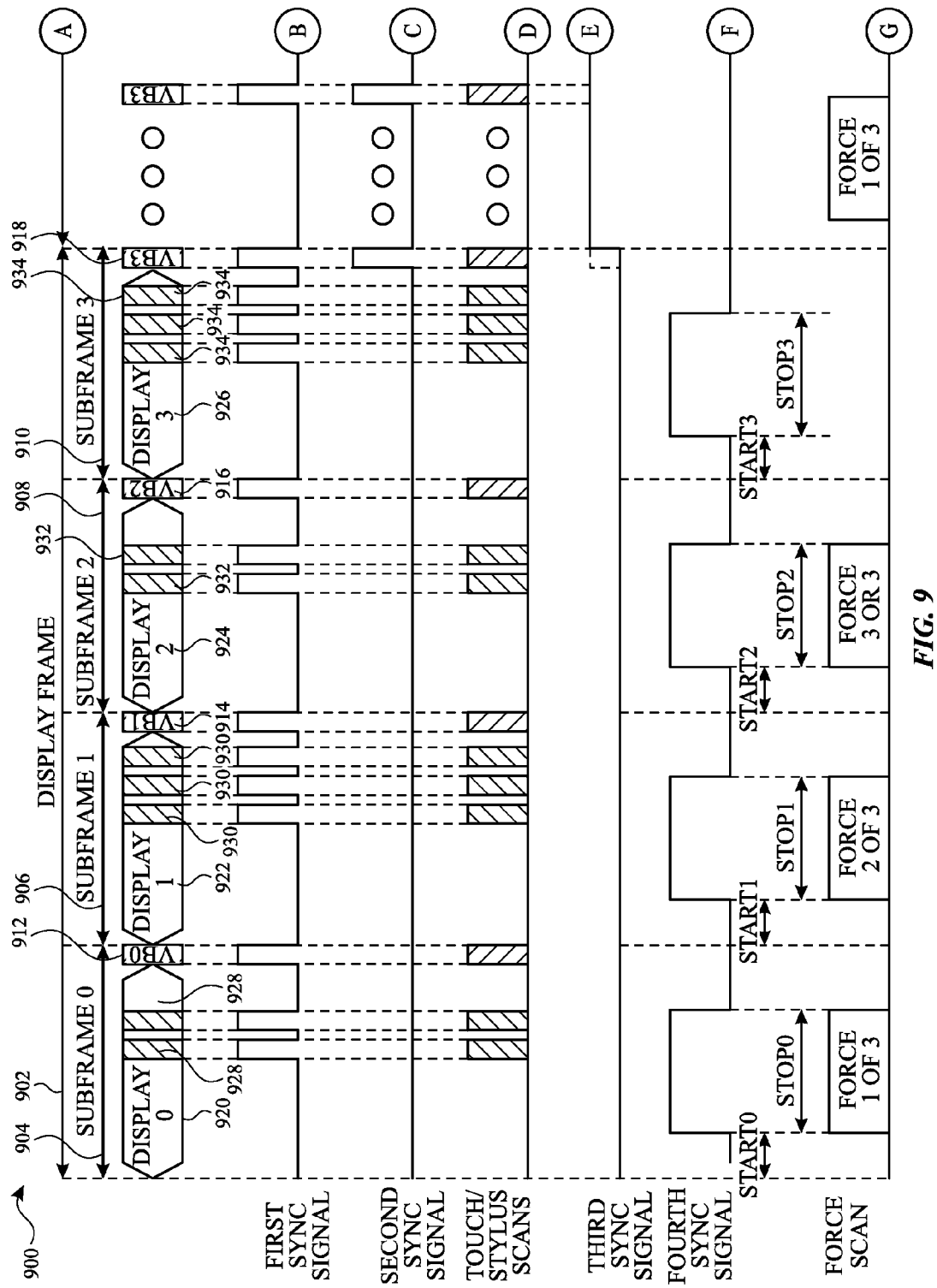
FIG. 9 illustrates an exemplary timing diagram for synchronizing sensing operations with display operations for an in-cell touch screen display according to examples of the disclosure.
Figure 9:
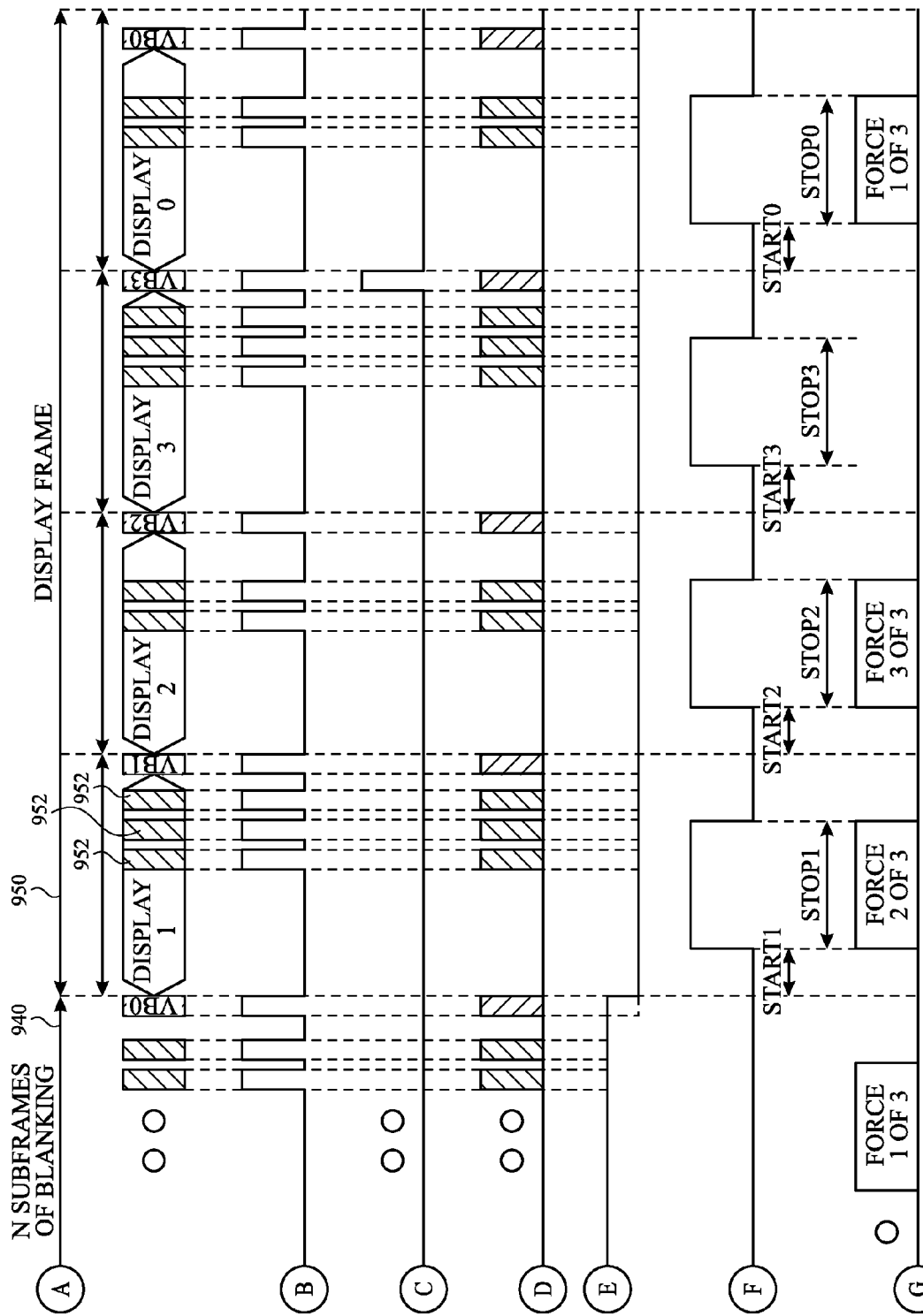

FIG. 9 illustrates an exemplary timing diagram for synchronizing sensing operations with display operations for an in-cell touch screen display according to examples of the disclosure. As illustrated in the timing diagram 900 of FIG. 9, the display frame 902 (e.g., a 60 Hz display frame) can be divided into four sub-frames 904, 906, 908 and 910. Although four sub-frames are illustrated in FIG. 9, the display frame can be divided into a different number of frames depending, for example, on the desired flexibility of variable refresh rates. Increasing the number of sub-frames can increase the range and granularity of the available variable refresh rates.

Each of sub-frames 904, 906, 908, and 910 can include a period of active refresh and vertical blanking. For example the first sub-frame ("sub-frame 0") 904 can have an active refresh period 920 and a vertical blanking period 912. Likewise the second, third and fourth sub-frames (sub-frames 1, 2 and 3) 906, 908 and 910 can have active refresh periods 922, 924 and 926, and vertical blanking periods 914, 916 and 918 respectively. Some or all of the sub-frames can include intra-sub-frame blanking. For example, the first and third sub-frames 904, 918 can have two intra-sub-frame blanking periods 928 and 932. Likewise, the second and fourth sub-frames 906, 910 can have three intra-sub-frame blanking periods 930 and 934. The number of intra-sub-frame blanking periods can vary (including none) depending on the scanning and display requirements of the system. During each sub-frame, the display can actively refresh a portion of the display such that over the course of four sub-frames of display frame 902, the entire display can be refreshed.

Synchronization signals can be generated by the host processor 816. For example, the host processor 816 can generate four synchronization signals. A first synchronization signal can be logic high during periods corresponding to intra-sub-frame blanking and/or sub-frame vertical blanking. The first synchronization signal can be used to synchronize scans that require blanking with blanking periods of the display. A second synchronization signal can be logic high during periods corresponding to vertical blanking at the end of a display frame. The second synchronization signal can act as a signal to synchronize the touch controller 812 with the display. Thus, for example, during sub-frames 904, 906, 908 and 910, the touch controller can perform no touch or stylus scanning during active refresh portions of the display (components of the in-cell touch screen needed for scanning can be used for display purposes). During the intra-sub-frame blanking 928, 930, 932 and 934, the touch controller can perform stylus scans, for example. Likewise, during the vertical blanking 912, 914, 916 and 918, the touch controller can perform touch scans (on some or all of the electrodes of the display). The third synchronization and fourth synchronization signals and the force scan can operate as discussed above with respect to FIG. 7 and are not repeated here for simplicity.

During the extended blanking sub-frames, the host processor 816 can continue to send the touch controller 812 the second synchronization signal to preserve the synchronization between the touch controller 812 and the display. The various touch and/or stylus scans can continue to be performed, without regard for the first synchronization signal (though "fake" synchronization signals can continue to be generated) as long as the display is in extended blanking.

At the conclusion of N extended blanking sub-frames, the display operation and touch, stylus and/or force scans can continue. For example, as illustrated in FIG. 9, at the conclusion of extended blanking 940, the first display sub-frame 950 can be refreshing the display corresponding to the portion of the display updated in the second sub-frame 906 in frame 902. The host controller can even maintain the intra-sub-frame blanking period 952 that can correspond to the expected display intra-sub-frame blanking period 930 expected by the sensing system. Likewise, the touch scan performed during sub-frame 950 can be the same stylus and/or touch sensing scan performed during sub-frame 906 even though it can be a continuation of a scan that was performed in the previous sub-frame during N sub-frames of extended blanking 940. Similarly, the force scan performed during sub-frame 950 can be the second of three force scans. The touch, stylus and/or force scans, however, can continue and remain synchronized with the updating of the display because the sensing scans remain synchronized with the display sub-frames. Preserving the synchronization between touch, stylus and/or force scans and the display sub-frames can permit uninterrupted touch, stylus and/or force scans along with the benefits of synchronizing various scans to occur during intra-sub-frame blanking, vertical blanking and display line refresh.

Figure 10:
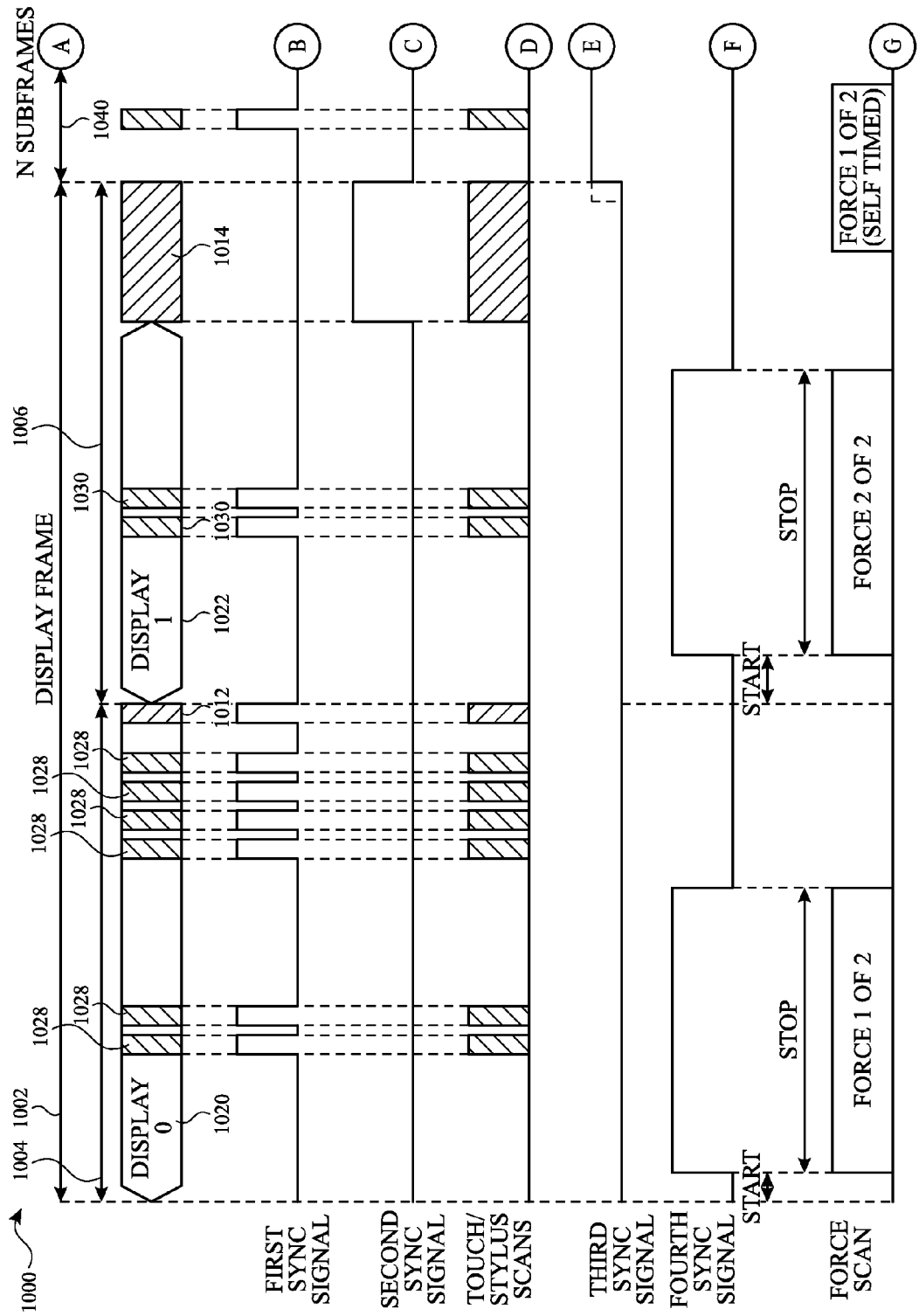
FIG. 10 illustrates another exemplary timing diagram for synchronizing sensing operations with display operations for an in-cell touch screen display according to examples of the disclosure.
Figure 10:
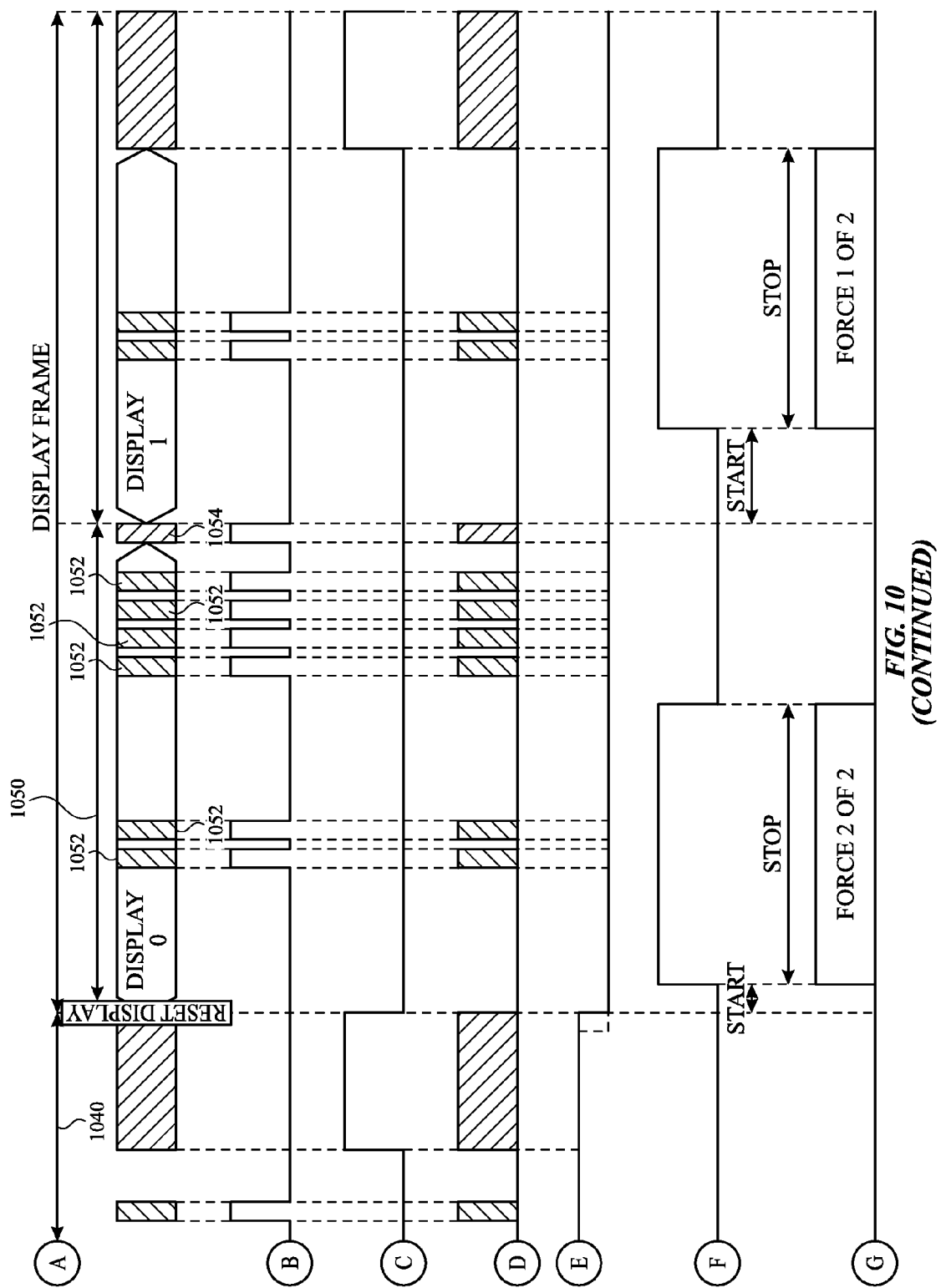

FIG. 10 illustrates another exemplary timing diagram for synchronizing sensing operations with display operations for an in-cell touch screen display according to examples of the disclosure. As illustrated in the timing diagram 1000 of FIG. 10, the display frame 1002 (e.g., a 60 Hz display frame) can be divided into two sub-frames 1004 and 1006. Although two sub-frames are illustrated in FIG. 10, the display frame can be divided into a different number of frames depending, for example, on the desired flexibility of variable refresh rates. Increasing the number of sub-frames can increase the range and granularity of the available variable refresh rates.

Each of sub-frames 1004 and 1006 can include a period of active refresh and vertical blanking. For example the first sub-frame 1004 can have an active refresh period 1020 and a vertical blanking period 1012. Likewise the second sub-frame 1006 can have active refresh periods 1022 and a vertical blanking period 1014. It should be noted that the vertical blanking 1014 at the end of the second sub-frame 1006 can be considerably longer than the vertical blanking 1012 at the end of the first sub-frame 1004. Some or all of the sub-frames can include intra-sub-frame blanking. For example, the first sub-frames 1004 can have six intra-sub-frame blanking periods 1028. Likewise, the second sub-frame 1006 can have two intra-sub-frame blanking periods 1030. The number of intra-sub-frame blanking periods can vary (including none), depending on the scanning and display requirements of the system. During each sub-frame, the display can actively refresh a portion of the display such that over the course of two sub-frames of the display frame 1002, the entire display can be refreshed.

Synchronization signals can be generated by the host processor 816. For example, the host processor 816 can generate four synchronization signals. A first synchronization signal can be logic high during periods corresponding to intra-sub-frame blanking and/or sub-frame vertical blanking. The first synchronization signal can be used to synchronize scans that require blanking with blanking periods of the display. A second synchronization signal can be logic high during periods corresponding to vertical blanking at the end of a display frame. The second synchronization signal can act as a signal to synchronize the touch controller 812 with the display. Thus, for example, during sub-frames 1004 and 1006, the touch controller can perform no touch or stylus scanning during active refresh portions of the display (components of the in-cell touch screen needed for scanning can be used for display purposes). During the intra-sub-frame blanking 1028 and 1030 the touch controller can perform stylus scans, for example. Likewise, during the vertical blanking 1012 the touch controller can perform touch scans (on some or all of the electrodes of the display) and during the vertical blanking 1014, the touch controller can perform touch and/or stylus scans. In the example of FIG. 10, the touch scan can be performed at 120 Hz (i.e., a complete touch scan occurs during each of the sub-frames). The third synchronization and fourth synchronization signals can operate as discussed above with respect to FIGS. 7 and 9 and are not repeated here for simplicity. Similarly, the force scan can operate as discussed above, though in the two sub-frame example of FIG. 10, the force scan can be divided into two sub-scans rather than into three sub-scans.

During the extended blanking, the host processor 816 can continue to send the touch controller 812 the second synchronization signal to preserve the synchronization between the touch controller 812 and the display. The various touch and/or stylus scans can continue to be performed, without regard for the first synchronization signal-though "fake" synchronization signals can continue to be generated—as long as the display can be in extended blanking. Generating "fake synchronization signals can simplify the design of controller hardware and/or firmware in some cases. For example, in some cases the touch controller can ignore the variable refresh rate condition and continue to function as expected for a default refresh rate during extended blanking periods. During the N sub-frames of extended blanking 1040, the touch scan can correspond to the touch scan of the second sub-frame 1006 (i.e., ending with the vertical blanking like 1014). The force scan, however, can continue to operate by performing either the first half or second half of the force scan during each sub-frame of extended blanking.

At the conclusion of N extended blanking sub-frames, the display can return to a full display frame and be reset. For example, even though the last sub-frame of extended blanking 1040 can correspond to the second sub-frame 1006, at the conclusion of extended blanking 1040, the first display sub-frame 1050 can be refreshing the display corresponding to the portion of the display updated in the first sub-frame 1004 of frame 1002. Although, the touch and/or stylus scan can complete in each sub-frame, the force scans can be mid-scan. Thus, the touch scan performed during sub-frame 1050 can be the same stylus and/or touch sensing scan performed during sub-frame 1004 and intra-sub-frame blanking 1052 and sub-frame vertical blanking 1054 can be the same as sub-frame 1004 (i.e., the behavior during a sub-frame corresponding to the beginning of display refresh). The force scan performed during sub-frame 1050 can be the second half of a force scan, the first half having been completed during the previous extended blanking frame 1040. Thus, the touch, stylus and/or force scans can continue and remain synchronized with the updating of the display because the sensing scans remain synchronized with the display sub-frames.

A pre-warning fourth synchronization signal can be used to prepare the touch and force controllers for the updated force and touch/stylus sensing scans. Specifically, the pre-warning on the rising edge of the fourth synchronization signal can be used to prepare the touch controller to perform the touch scan corresponding to sub-frame 1006 and the force controller to perform a self-timed force scan (e.g., not relying on the third synchronization signal). The pre-warning on the falling edge can be used to prepare the touch controller to resume scanning with the touch scan corresponding to sub-frame 1004 and the force controller to perform the next force scan (whether the first half of the force scan or second half of the force scan).

As discussed above, the extended blanking can occur for one or more sub-frames. In some examples, the system can have a defined number of sub-frames of extended blanking determined based on a desired variable refresh rate. In some examples, the system can have an immediate exit feature that can interrupt extended display blanking periods. Thus, even if two sub-frames of extended blanking can be expected to reduce the display refresh rate to 40 Hz, for example, an immediate exit request during the first sub-frame of extended blanking can prevent the execution of the subsequent planned sub-frame of extended blanking. The pre-warning synchronization signal can allow the touch and force controllers to update the scanning to accommodate the immediate exit feature.

Figure 11:
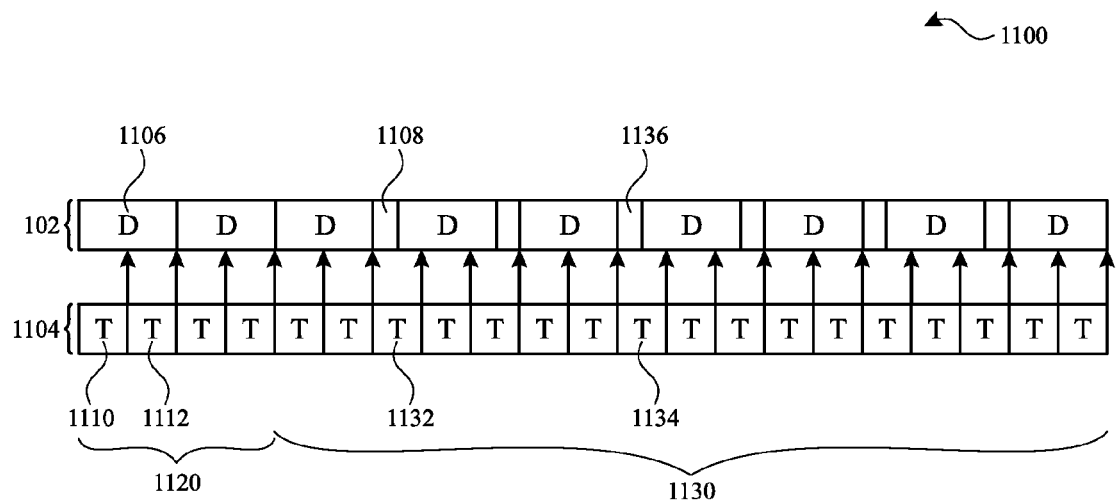
FIG. 11 illustrates an exemplary timing diagram showing a timing mismatch between reporting of touch sensing results and display information according to examples of the disclosure.

In the example of FIG. 6, the display operations and sensing operations can remain synchronized so that touch input reported corresponds to the image on the display because the sensing scans can be synchronized with the whole display frame. In other examples, however, the synchronization can be with sub-frames, and as a result there can be mismatch or variable latency between the sensing information and the display. FIG. 11 illustrates an exemplary timing diagram showing a timing mismatch between reporting of touch sensing results and display information according to examples of the disclosure. The timing diagram 1100 of FIG. 11 can include display timing 1102 and touch scan timing 1104 (stylus and force scans are not shown for simplicity). Display timing 1102 can include multiple display frames 1106 and sub-frames of extended blanking 1108. Touch scan timing 1104 can include multiple touch sensing scans 1110 and 1112. During period 1120, the display frames and scanning frames can be aligned, such that touch scans 1110 and 1112 can be performed during display frame 1106 with the results of the scans reported in the middle and end of display frame 1106 (the arrows can indicate reporting of the touch scan results). The reported scan results can be processed to determine touch event(s) and location(s), for example, to prepare the display for the appropriate response to the touch events. In some examples, the expected reporting can occur a short time before the next display refresh so that touch information can be processed to update the display properly. Extended blanking sub-frame 1108 can cause the display refresh rate to drop from 60 Hz to 48 Hz, for example. Thus, during period 1130, operating the display at a lower refresh rate than the touch sensing scan rate (because reducing the touch sensing scan frequency to match the refresh rate can degrade the touch sensing scan performance) can introduce variable latency between the reporting of touch scans and the corresponding image on the display. For example, touch scan 1132 and 1134 can be performed such that half of the scan can correspond to the previous image (maintained during extended blanking 1108 and 1136, respectively) and half of the scan can correspond to the next image. The scan results, however, can be reported entirely during the next display frame. As a result, the touch information expected just before the next display refresh is not available at the expected touch report time. The variable latency can cause a lag between display and touch, degrading device performance. For example, if the alignment between display refresh and touch reports changes (e.g., due to variable refresh rate), then the processing (e.g. by a software core) can receive touch events that are not consistently reported in time for the next display refresh.

Figure 12:
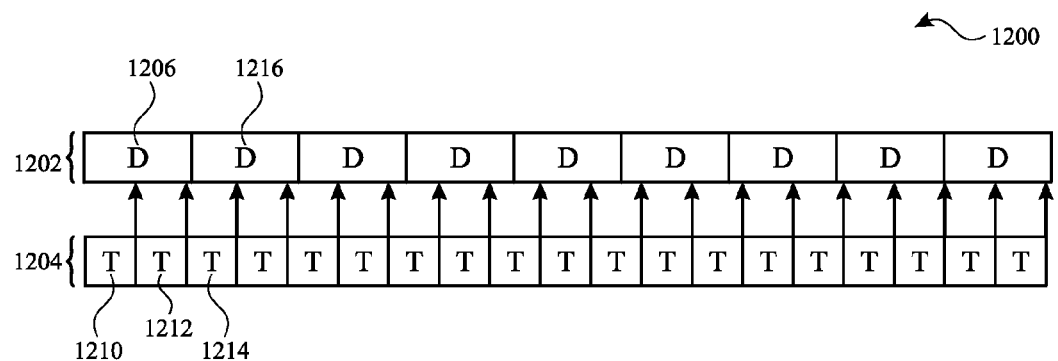
FIG. 12 illustrates an exemplary timing diagram showing a timing mismatch between reporting of touch sensing results and display information for an asynchronous touch and display system according to examples of the disclosure.

Another variable latency issue can arise for a system with unsynchronized display and touch scans. FIG. 12 illustrates an exemplary timing diagram showing a timing mismatch between reporting of touch sensing results and display information for an asynchronous touch and display system according to examples of the disclosure. The timing diagram 1200 of FIG. 12 can include display timing 1202 and touch scan timing 1204. Display timing 1202 can include multiple display frames 1206 with a given display frame rate (e.g. operating at 58 Hz). Touch scan timing 1204 can include multiple touch sensing scans 1210 and 1212 operating with a different scanning rate (e.g., operating at 60 Hz). Because the display frame rate and scanning rate can be different, the touch scan results corresponding in part to two different corresponding display frames can be reported during only one of the display frames. For example, touch scan 1214 can include scan results corresponding to display frame 1206 and also corresponding to display frame 1216, but the results can be reported during display frame 1216. The latency can cause a lag between display and touch, degrading device performance. Additionally, the example illustrated in FIG. 12 can cause, for example, one or more additional touch sensing scan to be completed without a display refresh occurring (i.e., one additional scan event can be reported before a display refresh). As a result, the processing (e.g., by a software core) of touch data and display data can cause a sudden display skipping artifact in some cases by processing newer touch data from the additional touch scan.

In some examples, the variable latency between display and touch can be reduced in software or firmware. Each touch sensing result can be time-stamped to include a timing parameter indicative of the timing of the scan result. The scan results can then be processed to associate scan results with the appropriate display frame. For example, some touch results of touch scan 1132 can be time-stamped such that the touch results corresponding to the previous frame and the touch results corresponding the next frame can be used to generate touch information corresponding to the expected reporting time. For example, interpolation using the time-stamps can be used to process touch data to estimate a touch location corresponding to an expected reporting time (e.g. at or before the beginning of a display refresh). For example, the touch locations reported before touch scan 1132 (e.g., at $T_1$) and reported at the conclusion of touch scan 1132 (e.g, at $T_2$) can be interpolated based on their time stamps to generate a touch location at the expected time of the report (i.e. at or near the beginning of display refresh following sub-frame extended blanking 108). Assuming, for example, a first reported touch event at location (0, 0) at $T_1$=0 (arbitrary units for location and time), a second reported touch event location (10, 10) at time $T_2$=10 (arbitrary units for location and time), and an expected report time at $T_R$=3 (arbitrary units) between $T_1$ and $T_2$, the touch event location at the expected time of report can be estimated to be at (3, 3) using interpolation (e.g., linear). Although, the above example describes linear interpolation, other forms of interpolation or other estimation techniques can be used to estimate the touch location at an expected time using time-stamped touch scan results. Similarly, time-stamps can be used for the example illustrated in FIG. 12 to interpolate touch event locations based on touch reports that can be misaligned with the expected reporting time.

Figure 13:
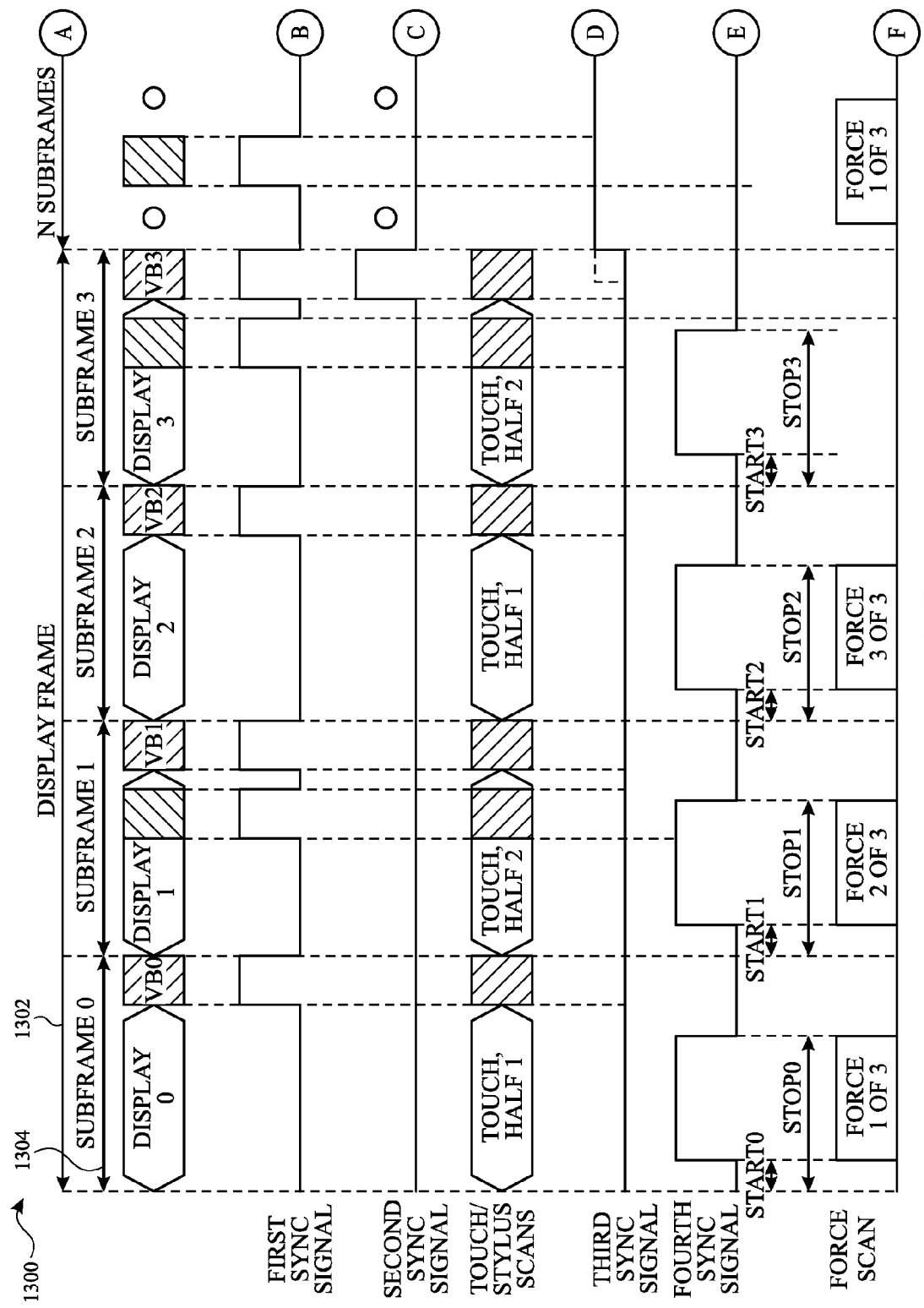
FIG. 13 illustrates another exemplary timing diagram for resolving latency between sensing results reporting and display by dropping some scan results according to examples of the disclosure.
Figure 13:
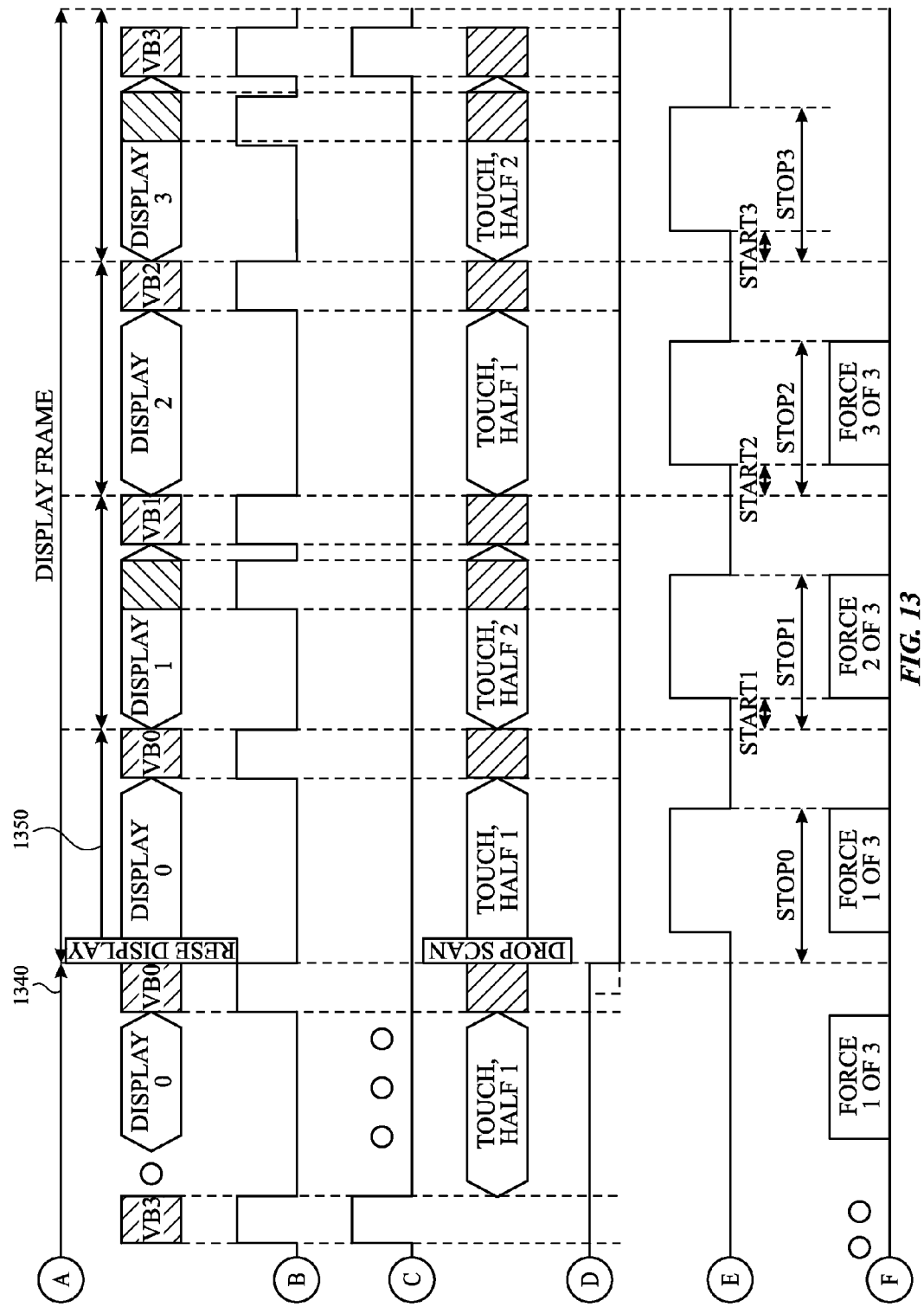

In other examples, the variable latency problem can be resolved by resetting the touch and display scanning after extended blanking, and in the process dropping some touch, stylus and/or force scan results. FIG. 13 illustrates another exemplary timing diagram for resolving latency between sensing results reporting and display by dropping some scan results according to examples of the disclosure. FIG. 13 follows the synchronization scheme and timing of FIG. 7, and for simplicity only the discussion of resetting the display and scans and dropping scan results will be discussed. After N sub-frames of extended blanking 1340, the display and touch, stylus and/or force scanning can be reset. As illustrated, at the end of the last sub-frame of extended blanking 1340, the display can conclude updating a first portion of the display and the corresponding vertical blanking operation ("Display0" and "VB0"), and conclude the first half of a touch scan ("Touch, Half 1") and the first third of a force scan ("Force 1 of 3"). Unlike FIG. 7, however, after exiting the extended blanking sub-frame(s), the display and scanning can be reset. Thus, during sub-frame 1350, the display can begin refreshing the display from the first portion as in the first sub-frame 1304 of a full display frame 1302. The corresponding touch, stylus and/or force scans corresponding to the first sub-frame 1304 can also begin during sub-frame 1350 (i.e., restart scans). The touch, stylus and/or force results from the uncompleted scans during the N sub-frames of extended blanking can be discarded. Thus, the touch, stylus and/or force scan information can be aligned with the display frames such that no latency can occur, though at the cost of discarding some scan data.

Figure 14:
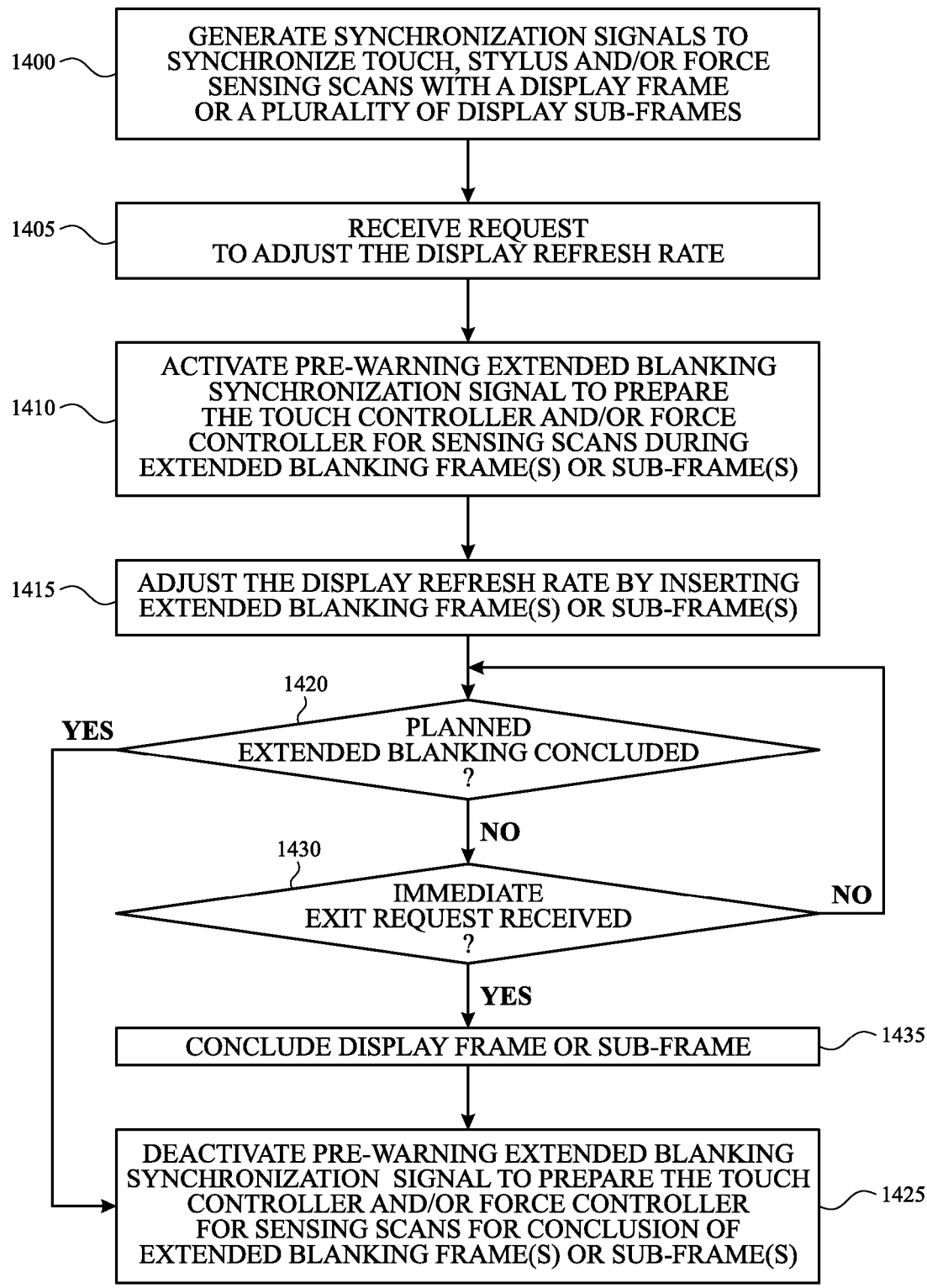
FIG. 14 illustrates an exemplary process for synchronizing display functions and various touch, stylus and/or force sensing functions according to examples of the disclosure.

FIG. 14 illustrates an exemplary process for synchronizing display functions and various touch, stylus and/or force sensing functions according to examples of the disclosure. The system can generate synchronization signals to synchronize touch, stylus and/or force sensing scans with one or more display frames or display sub-frames (1400). In some examples, the synchronization signals can be generated by a host processor and the synchronization signals can be used by the touch controller, force controller and/or display controller (e.g., display pipeline) to perform synchronous sensing scans and image display. In other examples, some of the synchronization signals can be generated by the display controller rather than by the host processor. If the system requires an adjusted display refresh rate (e.g., to save power or improve display smoothness), the host processor can receive and/or process a request to adjust the display refresh rate (1405). In response to the request, the system can activate a pre-warning synchronization signal to prepare the system for extended blanking and sensing scans during extended blanking (1410). For example, the host processor (and/or the display controller) can activate an extended blanking signal and transmit the signal to the touch controller and/or force controller to prepare for extended blanking for one or more display frames or one or more display sub-frames, and the touch controller and/or force controller for the appropriate touch, stylus and/force scans during extended blanking periods. The system can blank the display for one or more frames or sub-frames between full display frames to adjust the display frame rate (1415). For example, adding a full display frame of extended blanking can reduce a 60 Hz display refresh rate down to 30 Hz. Adding one sub-frame (in a configuration with four sub-frames per full display frame) of extended blanking can reduce a 60 Hz display refresh rate down to 48 Hz. The system can determine whether the planned extended blanking has completed (1420). If the extended blanking has completed, the system can deactivate (i.e., de-assert) the pre-warning synchronization signal to prepare the system for the conclusion of extended blanking (1425). For example, the host processor (and/or the display controller) can deactivate the extended blanking signal and transmit the signal to the touch controller and/or force controller to prepare for resuming touch, stylus and/or force scans appropriate during typical display operation (e.g., frames including active display refresh). At the conclusion of extended display blanking, the display can resume normal display operation (e.g., at a frame refresh rate of 60 Hz).

In some examples, the system can also include an immediate exit feature. If the extended blanking has not yet completed, the system can determine whether an immediate exit request is received (1430). If no immediate exit request is received, the system can continue extended blanking until an immediate exit request is received or the extended blanking concludes. If an immediate exit request is received, the system can conclude the extended blanking of the current display frame or sub-frame and not execute the remaining planned extended blanking frame(s) or sub-frame(s) (1435). The system can deactivate the pre-warning synchronization signal to so that the system can resume touch, stylus and/or force sensing scans and typical display frame operation (1425).

Therefore, according to the above, some examples of the disclosure are directed to an apparatus comprising a display, one or more sensors proximate to the display, and one or more processing circuits. The one or more processing circuits can be capable of performing one or more sensing operations for the one or more sensors during a plurality of scanning frames, performing one or more display operations for the display during a plurality of display frames, the plurality of scanning frames synchronized with the plurality of display frames, and adjusting a frame refresh rate of the display by blanking the display for one or more display frames. Additionally or alternatively to one or more of the examples disclosed above, the one or more processing circuits can comprise a display controller and a touch controller. The display controller can be capable of generating a pre-warning synchronization signal to prepare the touch controller for blanking of the display for the one or more display frames.

Other examples of the disclosure are directed to an apparatus comprising a display, one or more sensors proximate to the display, and one or more processing circuits. The one or more processing circuits can be capable of performing one or more sensing operations for the one or more sensors during a plurality of scanning frames, performing one or more display operations for the display during a plurality of display sub-frames, the plurality of scanning frames synchronized with the plurality of display sub-frames, and adjusting a frame refresh rate of the display by blanking the display for the duration of one or more display sub-frames between display frames. Additionally or alternatively to one or more of the examples disclosed above, the one or more processing circuits can be further capable of resetting the display operations for the display sub-frame following the blanking of the display for the one or more display sub-frames. Additionally or alternatively to one or more of the examples disclosed above, the one or more processing circuits can be further capable of resetting the one or more sensing operations for the display sub-frame following the blanking of the display for the one or more display sub-frames. Additionally or alternatively to one or more of the examples disclosed above, the one or more processing circuits can be further capable of discarding results of one or more incomplete sensing operations during the blanking of the display for the one or more display sub-frames. Additionally or alternatively to one or more of the examples disclosed above, the one or more processing circuits can be further capable of continuing the display operations and sensing operations following the blanking of the display for the one or more display sub-frames. Additionally or alternatively to one or more of the examples disclosed above, the one or more sensing operations can include timing information. The timing information can be used to align the results with the corresponding display information. Additionally or alternatively to one or more of the examples disclosed above, a sensing operation can be divided into a plurality of sub-scans occurring during a plurality of sub-frames, such that the sensing operation can be performed during a display frame. Additionally or alternatively to one or more of the examples disclosed above, the one or more processing circuits can further comprise a host controller and a touch controller, the host controller capable of generating a pre-warning synchronization signal to prepare the touch controller for sensing operations during and following the blanking of the display for the one or more display sub-frames.

Other examples of the disclosure are directed to a method executed by one or more processing circuits. The method can comprise performing one or more sensing operations for one or more sensors during a plurality of scanning frames, performing one or more display operations for a display during a plurality of display frames, the plurality of scanning frames synchronized with the plurality of display frames, and adjusting a frame refresh rate of the display by blanking the display for one or more display frames. Additionally or alternatively to one or more of the examples disclosed above, the method can further comprise generating a pre-warning synchronization signal to prepare for one or more sensing operations during the blanking of the display for the one or more display frames. Additionally or alternatively to one or more of the examples disclosed above, the pre-warning synchronization signal can be generated based on interface protocol between a host processor and a display controller.

Other examples of the disclosure are directed to a method executed by one or more processing circuits. The method can comprise performing one or more sensing operations for one or more sensors during a plurality of scanning frames, performing one or more display operations for a display during a plurality of display sub-frames, the plurality of scanning frames synchronized with the plurality of display sub-frames, and adjusting a frame refresh rate of the display by blanking the display for a duration of one or more display sub-frames between display frames. Additionally or alternatively to one or more of the examples disclosed above, the method can further comprise resetting the display operations for the display sub-frame following the blanking of the display for the one or more display sub-frames. Additionally or alternatively to one or more of the examples disclosed above, the method can further comprise resetting the one or more sensing operations for the display sub-frame following the blanking of the display for the one or more display sub-frames. Additionally or alternatively to one or more of the examples disclosed above, the method can further comprise discarding results of one or more incomplete sensing operations during the blanking of the display for the one or more display sub-frames. Additionally or alternatively to one or more of the examples disclosed above, the method can further comprise continuing the display operations and sensing operations following the blanking of the display for the one or more display sub-frames. Additionally or alternatively to one or more of the examples disclosed above, the results of the one or more sensing operations can include timing information. The timing information can be used to align the results with the corresponding display information. Additionally or alternatively to one or more of the examples disclosed above, the method can further comprise vertical blanking the display at the end of each display sub-frame.

Additionally or alternatively to one or more of the examples disclosed above, a sensing operation can be divided into a plurality of sub-scans occurring during a plurality of sub-frames, such that the sensing operation can be performed during a display frame. Additionally or alternatively to one or more of the examples disclosed above, the method can further comprise generating a pre-warning synchronization signal to prepare a touch controller for sensing operations during and following the blanking of the display for the one or more display sub-frames. Additionally or alternatively to one or more of the examples disclosed above, the method can further comprise generating a pre-warning synchronization signal to prepare a force controller for sensing operations during and following the blanking of the display for the one or more display sub-frames.

Some examples of the disclosure are directed to a non-transitory computer readable storage medium. The computer readable medium can contain instructions that, when executed by a processor, can perform a method. The method can comprise performing one or more sensing operations for one or more sensors during a plurality of scanning frames, performing one or more display operations for a display during a plurality of display frames, the plurality of scanning frames synchronized with the plurality of display frames, and adjusting a frame refresh rate of the display by blanking the display for one or more display frames. Some examples of the disclosure are directed to a non-transitory computer readable storage medium. The computer readable medium can contain instructions that, when executed by a processor, can perform a method. The method can comprise performing one or more sensing operations for one or more sensors during a plurality of scanning frames, performing one or more display operations for a display during a plurality of display sub-frames, the plurality of scanning frames synchronized with the plurality of display sub-frames; and adjusting a frame refresh rate of the display by blanking the display for the duration of one or more display sub-frames between display frames.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An apparatus comprising:
a display;
one or more sensors proximate to the display;
one or more processing circuits capable of:
performing one or more sensing operations for the one or more sensors during a plurality of scanning frames;
performing one or more display operations for the display during a plurality of display frames, the plurality of scanning frames synchronized with the plurality of display frames; and
adjusting a frame refresh rate of the display by blanking the display for one or more display frames during an extended blanking period;
wherein the one or more processing circuits comprises a display controller, a touch controller, and a host processor, and wherein the display controller or the host processor are capable of generating at least a first signal and a second signal;
wherein the first signal is a pre-warning synchronization signal, which toggles early to prepare the touch controller for sensing operations during and following the extended blanking period; and
wherein the second signal does not toggle early.

2. An apparatus comprising:
a display;
one or more sensors proximate to the display; and
one or more processing circuits capable of:
performing one or more sensing operations for the one or more sensors during a plurality of scanning frames;
performing one or more display operations for the display during a plurality of display sub-frames, the plurality of scanning frames synchronized with the plurality of display sub-frames; and
adjusting a frame refresh rate of the display by blanking the display for a duration of one or more display sub-frames between display frames;
wherein the one or more processing circuits comprises a host controller and a touch controller, the host controller capable of generating at least a first signal and a second signal;
wherein the first signal is a pre-warning synchronization signal, which toggles early to prepare the touch controller for sensing operations during and following the blanking of the display for the one or more display sub-frames; and
wherein the second signal does not toggle early.

3. The apparatus of claim 2, wherein the one or more processing circuits are further capable of:
in accordance with a determination that the duration of the blanking of the display for the one or more display sub-frames does not match a duration of an integer number of display frames, resetting the display operations for the display sub-frame following the blanking of the display for the one or more display sub-frames; and
in accordance with a determination that the duration of the blanking of the display for the one or more display sub-frames does match the duration of the integer number of display frames, not resetting the display operations for the display sub-frame following the blanking of the display for the one or more display sub-frames.

4. The apparatus of claim 2, wherein the one or more processing circuits are further capable of:
in accordance with a determination that the duration of the blanking of the display for the one or more display sub-frames does not match a duration of an integer number of display frames, resetting the one or more sensing operations for the display sub-frame following the blanking of the display for the one or more display sub-frames; and
in accordance with a determination that the duration of the blanking of the display for the one or more display sub-frames does match the duration of the integer number of display frames, not resetting the one or more sensing operations for the display sub-frame following the blanking of the display for the one or more display sub-frames.

5. The apparatus of claim 4, wherein the one or more processing circuits are further capable of:
in accordance with the determination that the duration of the blanking of the display for the one or more display sub-frames does not match the duration of the integer number of display frames, discarding results of one or more incomplete sensing operations during the blanking of the display for the one or more display sub-frames.

6. The apparatus of claim 2, wherein the one or more processing circuits are further capable of continuing the display operations and sensing operations following the blanking of the display for the one or more display sub-frames.

7. The apparatus of claim 2, wherein the one or more sensing operations include timing information, the timing information used to align results of the one or more sensing operations with corresponding display information.

8. The apparatus of claim 2, wherein a sensing operation is divided into a plurality of sub-scans occurring during a plurality of sub-frames, such that the sensing operation can be performed during a display frame.

9. A method executed by one or more processing circuits, the method comprising:
performing one or more sensing operations for one or more sensors during a plurality of scanning frames;
performing one or more display operations for a display during a plurality of display frames, the plurality of scanning frames synchronized with the plurality of display frames; and
adjusting a frame refresh rate of the display by blanking the display for one or more display frames during an extended blanking period;
generating at least a first signal and a second signal;
wherein the first signal is a pre-warning synchronization signal, which toggles early to prepare the touch controller for sensing operations during and following the extended blanking period; and
wherein the second signal does not toggle early.

10. The method of claim 9, wherein the signal between the host processor and the display controller is a wake-up interface protocol between the host processor and the display controller.

11. A method executed by one or more processing circuits, the method comprising:
performing one or more sensing operations for one or more sensors during a plurality of scanning frames;
performing one or more display operations for a display during a plurality of display sub-frames, the plurality of scanning frames synchronized with the plurality of display sub-frames; and
adjusting a frame refresh rate of the display by blanking the display for a duration of one or more display sub-frames between display frames;
generating at least a first signal and a second signal;
wherein the first signal is a pre-warning synchronization signal, which toggles early to prepare the touch controller for sensing operations during and following the blanking of the display for the one or more display sub-frames; and
wherein the second signal does not toggle early.

12. The method of claim 11, further comprising:
in accordance with a determination that the duration of the blanking of the display for the one or more display sub-frames does not match a duration of an integer number of display frames, resetting the display operations for the display sub-frame following the blanking of the display for the one or more display sub-frames; and
in accordance with a determination that the duration of the blanking of the display for the one or more display sub-frames does match the duration of the integer number of display frames, not resetting the display operations for the display sub-frame following the blanking of the display for the one or more display sub-frames.

13. The method of claim 11, further comprising:
in accordance with a determination that the duration of the blanking of the display for the one or more display sub-frames does not match a duration of an integer number of display frames, resetting the one or more sensing operations for the display sub-frame following the blanking of the display for the one or more display sub-frames; and
in accordance with a determination that the duration of the blanking of the display for the one or more display sub-frames does match the duration of the integer number of display frames, not resetting the one or more sensing operations for the display sub-frame following the blanking of the display for the one or more display sub-frames.

14. The method of claim 13 further comprising:
in accordance with the determination that the duration of the blanking of the display for the one or more display sub-frames does not match the duration of the integer number of display frames, discarding results of one or more incomplete sensing operations during the blanking of the display for the one or more display sub-frames.

15. The method of claim 11, further comprising continuing the display operations and sensing operations following the blanking of the display for the one or more display sub-frames.

16. The method of claim 11, wherein results of the one or more sensing operations include timing information, the timing information used to align results of the sensing operations with corresponding display information.

17. The method of claim 11, further comprising vertical blanking the display at an end of each display sub-frame.

18. The method of claim 11, wherein a sensing operation is divided into a plurality of sub-scans occurring during a plurality of sub-frames, such that the sensing operation can be performed during a display frame.

19. The method of claim 11, further comprising generating a pre-warning synchronization signal to prepare a force controller for sensing operations during and following the blanking of the display for the one or more display sub-frames.

20. A non-transitory computer readable storage medium, the computer readable medium containing instructions that, when executed by a processor, can perform a method, the method comprising:
performing one or more sensing operations for one or more sensors during a plurality of scanning frames;
performing one or more display operations for a display during a plurality of display frames, the plurality of scanning frames synchronized with the plurality of display frames; and
adjusting a frame refresh rate of the display by blanking the display for one or more display frames during an extended blanking period;
generating at least a first signal and a second signal;
wherein the first signal is a pre-warning synchronization signal, which toggles early to prepare the touch controller for sensing operations during and following the extended blanking period; and
wherein the second signal does not toggle early.

21. A non-transitory computer readable storage medium, the computer readable medium containing instructions that, when executed by a processor, can perform a method, the method comprising:
- performing one or more sensing operations for one or more sensors during a plurality of scanning frames;
- performing one or more display operations for a display during a plurality of display sub-frames, the plurality of scanning frames synchronized with the plurality of display sub-frames; and
- adjusting a frame refresh rate of the display by blanking the display for a duration of one or more display sub-frames between display frames;
- generating at least a first signal and a second signal;
- wherein the first signal is a pre-warning synchronization signal, which toggles early to prepare the touch controller for sensing operations during and following the blanking of the display for the one or more display sub-frames; and
- wherein the second signal does not toggle early.

* * * * *